(12) United States Patent
Kim et al.

(10) Patent No.: US 7,277,407 B2
(45) Date of Patent: Oct. 2, 2007

(54) APPARATUS AND METHOD FOR CONTROLLING TRANSMIT ANTENNA ARRAY FOR PHYSICAL DOWNLINK SHARED CHANNEL IN A MOBILE COMMUNICATION SYSTEM

(75) Inventors: Sung-Jin Kim, Suwon-shi (KR);
Yong-Suk Lee, Suwon-shi (KR);
Hyun-Woo Lee, Suwon-shi (KR);
Sung-Oh Hwang, Yongin-shi (KR);
Byung-Jae Kwak, Songnam-shi (KR);
Yong-Jun Kwak, Yongin-shi (KR);
Sung-Ho Choi, Songnam-shi (KR);
Sang-Hwan Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 861 days.

(21) Appl. No.: 09/975,419

(22) Filed: Oct. 11, 2001

(65) Prior Publication Data

US 2002/0131381 A1 Sep. 19, 2002

(30) Foreign Application Priority Data

| Oct. 11, 2000 | (KR) | ............................... 2000-59869 |
| Nov. 24, 2000 | (KR) | ............................... 2000-70579 |
| Mar. 2, 2001 | (KR) | ............................... 2001-10926 |

(51) Int. Cl.
*H04Q 7/00* (2006.01)

(52) U.S. Cl. ....................... 370/328; 370/335; 370/332; 370/442

(58) Field of Classification Search ................ 370/328, 370/331, 332, 333, 334, 335, 342, 441, 445; 455/442, 436
See application file for complete search history.

(56) References Cited

U.S. PATENT DOCUMENTS

| 5,101,501 | A | * | 3/1992 | Gilhousen et al. .......... 455/442 |
| 6,067,324 | A | | 5/2000 | Harrison |
| 6,069,912 | A | * | 5/2000 | Sawahashi et al. ......... 375/142 |
| 6,115,406 | A | * | 9/2000 | Mesecher .................... 375/130 |
| 6,205,166 | B1 | * | 3/2001 | Maruta et al. ............... 375/130 |

(Continued)

FOREIGN PATENT DOCUMENTS

EP 0 966 125 12/1999

(Continued)

OTHER PUBLICATIONS

Universal Mobile Telecommunications System (UMTS); Physical Layer Procedures (FDD); Release 1999, ETSI TS 125 214 v3.4.0, Sep. 2000.

*Primary Examiner*—Wing Chan
*Assistant Examiner*—Andrew C. Lee
(74) *Attorney, Agent, or Firm*—The Farrell Law Firm

(57) ABSTRACT

In a mobile communication system, if a UE enters a SHO (Soft Handover) region, the UE determines weight information for a DPCH and a PDSCH depending on DPCH signals and PDSCH signals received from Node Bs, and transmits the determined weight information to the Node Bs. The Node Bs then determine weights of the DPCH signals and the PDSCH signals to be transmitted to the UE depending on the feedback information received from the UE, and transmit the determined weights to the UE along with the DPCH signals and the PDSCH signals, respectively.

10 Claims, 15 Drawing Sheets

U.S. PATENT DOCUMENTS

| | | | |
|---|---|---|---|
| 6,333,926 B1 * | 12/2001 | Van Heeswyk et al. | 370/335 |
| 6,442,193 B1 * | 8/2002 | Hirsch | 375/147 |
| 6,597,678 B1 * | 7/2003 | Kuwahara et al. | 370/342 |
| 6,714,584 B1 * | 3/2004 | Ishii et al. | 375/148 |
| 6,724,828 B1 * | 4/2004 | Dabak | 375/267 |
| 6,816,717 B1 * | 11/2004 | Sipila | 455/277.2 |
| 6,862,275 B1 * | 3/2005 | Dabak | 370/342 |
| 6,868,075 B1 * | 3/2005 | Narvinger et al. | 370/335 |
| 6,904,076 B1 * | 6/2005 | Tsutsui et al. | 375/130 |
| 6,970,438 B2 * | 11/2005 | Mate et al. | 370/329 |
| 2002/0009061 A1 * | 1/2002 | Willenegger | 370/328 |
| 2002/0141331 A1 * | 10/2002 | Mate et al. | 370/218 |

FOREIGN PATENT DOCUMENTS

| | | |
|---|---|---|
| JP | 2000-069570 | 3/2000 |
| WO | WO 00/36764 | 6/2000 |

* cited by examiner

APPARATUS AND METHOD FOR CONTROLLING TRANSMIT ANTENNA ARRAY FOR PHYSICAL DOWNLINK SHARED CHANNEL IN A MOBILE COMMUNICATION SYSTEM

PRIORITY

This application claims priority to an application entitled "Apparatus and Method for Controlling Transmit Antenna Array for Physical Downlink Shared Channel in a Mobile Communication System" filed in the Korean Industrial Property Office on Oct. 11, 2000 and assigned Serial No. 2000-59869, an application entitled "Apparatus and Method for Controlling Transmit Antenna Array for Physical Downlink Shared Channel in a Mobile Communication System" filed in the Korean Industrial Property Office on Nov. 24, 2000 and assigned Serial No. 2000-70579, and an application entitled "Apparatus and Method for Controlling Transmit Antenna Array for Physical Downlink Shared Channel in a Mobile Communication System" filed in the Korean Industrial Property Office on Mar. 2, 2001 and assigned Serial No. 2001-19026, the contents of all of which are hereby incorporated by reference.

BACKGROUND OF THE INVENTION

1. Field of the Invention

The present invention relates generally to a mobile communication system, and in particular, to an apparatus and method for controlling a transmit antenna array (TxAA) for a physical downlink shared channel (PDSCH) in a soft handover (SHO) region.

2. Description of the Related Art

In general, a physical downlink shared channel (PDSCH) used in an asynchronous W-CDMA (Wideband Code Division Multiple Access) mobile communication system, a type of a $3^{rd}$ generation mobile communication system, refers a channel shared by a plurality of UEs (User Equipments). The PDSCH is a channel assigned to transmit packet data or high-rate data to the UEs in a 10 ms radio frame unit, and is commonly used by a plurality of the UEs. The PDSCH can vary a data rate of transmission data in a frame unit, and can also perform weight adjustment on a transmit antenna array and power control in a slot unit, like a dedicated channel (DCH) established between a Node B and a UE in the W-CDMA system. The radio frame, a basic unit for transmitting signals in the W-CDMA system, has a length of 10 ms, and each radio frame is comprised of 15 slots. In addition, the PDSCH is a channel for transmitting user data only. When the PDSCH is assigned to the UE for power control on the PDSCH, a downlink dedicated physical channel (DL-DPCH) is assigned to the UE in association with the PDSCH. Here, the DL-DPCH becomes a channel for power control on the PDSCH. The PDSCH can be continuously transmitted to one UE over a plurality of frames. Alternatively, the PDSCH can be transmitted to the UE over only one frame. In addition, the time to transmit the frames to a plurality of the UEs is determined by scheduling in an upper layer.

A structure of the PDSCH and a structure of the DL-DPCH assigned to the UE in association with the PDSCH will be described with FIGS. 1A and 1B. FIG. 1A illustrates a structure of the PDSCH used in a mobile communication system, and FIG. 1B illustrates a structure of the DL-DPCH assigned to the UE in association with the PDSCH.

Referring to FIG. 1A, a radio frame 101 of the PDSCH is 10 ms in length, and is comprised of 15 slots Slot#0–Slot#14. Each slot, e.g., a slot Slot#i (103), has a length of 2560 chips, and an amount of information transmitted over the Slot#i 103 is in inverse proportion to a spreading factor (SF) used for the PDSCH slots. The SF has a value of 4 to 256, and transmission information data is spread according to the SF value. Only the user data is transmitted over the PDSCH.

Next, referring to FIG. 1B, when the PDSCH shown in FIG. 1A is used, the DL-DPCH associated with the PDSCH is assigned to the corresponding UE by the Node B. A radio frame 111 of the DL-DPCH is also comprised of 15 slots Slot#0–Slot#14, and each slot, as shown in FIG. 1B, is comprised of Data1 bits 112, TPC (Transmit Power Control) bits 113, TFCI (Transmit Format Combination Indicator) bits 114, Data2 bits 115, and Pilot bits 116. Each slot of the DL-DPCH can have various structures according to the lengths of Data1, TPC, TFCI, Data2 and Pilot.

The Data1 bits 112 and the Data2 bits 115 are transmitted over a downlink dedicated physical data channel (DL-DPDCH), and the DL-DPDCH transmits user data and signaling information from the upper layer. The TPC 113, the TFCI 114, and the Pilot 116 are transmitted over a downlink dedicated physical control channel (DL-DPCCH). The TPC 113 is a field for transmitting a command for controlling transmission power of uplink channels transmitted from the UE to the Node B; the TFCI 114 is a field for transmitting a codeword indicating that transport channels having different data rates are transmitted over the DL-DPCH; and the Pilot 116 is a field for enabling the UE to measure transmission power of a downlink signal for power control on the received downlink signal. Here, the "transport channel" refers to a channel serving to connect a physical channel for actually transmitting the data to the upper layer.

In the W-CDMA system, for a closed-loop transmit antenna array for the PDSCH, the UE receiving the DL-DPCH 111 transmits, to the Node B, weight information acquired by measuring a common pilot channel (CPICH) received from the Node B. That is, upon receiving the CPICH transmitted from the Node B, the UE compensates for its phase difference thereby to detect a weight proper for the maximum receiving power level. The weight information created depending on the detected weight is transmitted to the Node B, and the Node B applies corresponding weights to respective antennas for the DL-DPCH transmitted to the UE, depending on the weight information of the DL-DPCH and/or PDSCH received from the UE, before transmission.

With reference to FIG. 2, a description will be made of the downlink and uplink signal flows for the case where the UE receiving the PDSCH is located in a soft handover (or handoff) region. FIG. 2 illustrates downlink and uplink signal flows for the case where a UE receiving a PDSCH is located in a soft handover region, wherein for simplicity, only two Node Bs are considered.

In a soft handover (SHO) process, when a UE moves away from a current Node B1 in communication with the UE, and at the same time moves to an area where it can receive signals from an adjacent new Node B2, the UE receives the signals not only from the current Node B1 but also from the new Node B2. In this state, if a quality (or level) of the signal received from the Node B1 is less than a predetermined threshold, the UE releases the channel established to the Node B1, and then establishes a new channel to the Node B2 providing high-quality signals, thus performing the handover process. By doing so, it is possible to maintain a call without interruption.

Referring to FIG. 2, a Node B1 201, which is currently communicated with a UE 211, transmits a PDSCH and a DL-DPCH associated with the PDSCH to the UE 211. However, a Node B2 203 transmits only the DL-DPCH to the UE 211 when the UE 211 moves to an SHO region between the Node B1 201 and the Node B2 203. A set of all the Node Bs set to transmit signals to the UE 211 existing in the SHO region is called an "active set". That is, the Node B1 201 transmits both the DL-DPCH and the PDSCH to the UE 211, and Node B2 203 is newly admitted to the active set and transmits only a DL-DPCH to the UE 211. The UE 211 broadcasts the UL-DPCH to Node B1 201 and Node B2 203 indiscriminately. In the prior art, when the UE 211 enters an SHO region, the UE 211 receives CPICHs from node B1 201 and node B2 203 together and measures the signal strengths of the CPICHs to select a primary node B among the Node Bs. The UE 211 transmits the temporary ID of a node B designated as a primary Node B in the feedback information (FBI) field of a UL_DCH. The FBI is 2 fields in length as shown. An S field of the FBI that the UE 211 transmits to the node B when SSDT (Site Selection Diversity Transmission) is employed. A D field of the FBI that the UE 211 transmits to a Node B when transmission antenna diversity is employed. The S field consists of 0, 1 or 2 bits. If the S field consists of 0 bit, this implies that the SSDT is not used. If the SSDT is used, the FBI field transmits a codeword representing the temporary ID of a primary Node B. The D field consists of 0, 1, or 2 bits. If the D field consists of 0 bit, this implies that the transmission antenna diversity is not used. In the case of 1 bit, the transmission antenna diversity is used together with the SSDT, and in the case of 2 bits, only the transmission antenna diversity is adopted.

When the UE 211 receiving the PDSCH from the Node B1 201 exists in the SHO region, a problem occurs in that the UE 211 receives both the PDSCH and the DL-DPCH from the Node B1 201 but receives only the DL-DPCH from the Node B2 203. Here, the typical reason that the PDSCH does not support the SHO is because compared with the DL-DPCH, the PDSCH transmits data at a relatively high data rate, thus consuming an increased number of channel resources of the Node B. As a result, system capacity is affected. In addition, the W-CDMA mobile communication system may have a timing problem due to non-synchronization between the Node Bs. In order to support the SHO, the PDSCH shared by a plurality of the UEs requires elaborate scheduling for the time points where it is used by the respective UEs. In light of the scheduling, it is difficult to embody transmission of the PDSCH from the new Node B to the UE.

The DL-DPCHs transmitted from the Node B1 201 and the Node B2 203 are received at the UE 211, and then subjected to soft combining. Here, "soft combining" refers to combining the signals received at the UE through different paths. Therefore, by calculating a phase difference between the CPICHs received from the Node Bs and then compensating for the phase difference, it is possible to reduce the influence of fading and noise, which affect the signals received at the UE 211. Soft combining is available only when the UE 211 receives the same information from the different Node Bs. However, when the UE 211 receives different information from the Node Bs, the received information, though subjected to soft combining, will be recognized as a noise component, resulting in an increase in the noise component of the signal.

In the process of analyzing the DL-DPCH, the downlink signals transmitted to the UE 211 from the respective Node Bs, i.e., the Node B1 201 and the Node B2 203, are subjected to soft combining except for the TPC bits 113 shown in FIG. 1B. The reason that the TPC 113 is analyzed separately rather than being analyzed by soft combining is because the TPCs received at the UE 211 from the respective Node Bs may be different from each other, since the signal received at the Node B1 201 from the UE 211 is high in level while the signal received at the Node B2 203 from the UE 211 is low in level, or vice versa, due to movement of the UE 211. Therefore, the TPC 113 is analyzed through a separate TPC analysis algorithm for a plurality of the Node Bs, rather than being subjected to soft combining.

With reference to FIG. 2, a description has been made of the downlink and the uplink signals for the case where the UE is located in the SHO region. Next, an operation of a transmit antenna array (TxAA) supporting the SHO will be described with reference to FIG. 3.

FIG. 3 illustrates an operation of a transmit antenna array using the conventional soft handover scheme. Referring to FIG. 3, when a UE 311 is located in an SHO region during a call, a Node B1 301 and a Node B2 303 transmitting signals to the UE 311 decrease their transmission power, for soft handover of the call service, and at the same time, the UE 311 calculates weights depending on a phase difference between the CPICHs transmitted from both of the Node Bs so as to maximize SINR (Signal-to-Interference+Noise Ratio), and then feeds the weights back to the Node B1 301 and the new Node B2 303 over the DL-DPCH and the PDSCH of the Node B1 301 and the new Node B2 303.

The UE 311 soft-combines the signals received from the Node B1 301 and the Node B2 303 with the weights transmitted to the Node Bs over a FBI (Feedback Information) field of an uplink dedicated physical control channel (UL-DPCCH) shown in FIG. 3, and then, determines the weights so as to maximize the SINR of the soft-combined received signals. That is, since the UE 311 soft-combines the signals received from the Node B1 301 and the Node B2 303 and determines the feedback weights of the received signals so as to maximize the SINR, a conventional method for applying an optimal weight for the PDSCH, in which only one Node B in the SHO region, e.g., the Node B1 301 having the highest received signal level should transmit the signals, has the following disadvantages:

If the UE 311 is located in a non-SHO region, the transmit antenna weights for the PDSCH and the DL-DPCH transmitted to the UE 311 are identical to each other. In other words, the transmit antenna array weight for the PDSCH is determined in association with the DL-DPCH. A change in a ratio of the phase and size of the two antennas for the DL-DPCH causes an equivalent change in the weights, since the PDSCH is transmitted over the same channel. For this reason, for the weight for the PDSCH, the weight for the associated DL-DPCH is used.

However, if the UE 311 is located in the SHO region, the transmit antenna arrays for the DL-DPCH and the PDSCH are equally determined using the weights determined by measuring a phase difference between the CPICHs from not only the Node B transmitting the PDSCH to the UE 311 but also other Node Bs registered in the active set. Specifically describing this with reference to FIG. 3, the transmit antenna array weight for the PDSCH is determined considering a channel environment between the UE 311 and the Node B having the highest received signal level, i.e., the Node B1 301, while the transmit antenna array weight for the DL-DPCH is determined considering the channel environment to not only the Node B1 301 having the highest received signal level but also the Node B2 303 in the active set of the UE 311.

As described above, since the transmit antenna weight for the PDSCH according to the conventional SHO scheme is proposed to have the same value as the transmit antenna weight for the DL-DPCH, the above problem occurs. That is, in the SHO region, the weights transmitted from the Node Bs to the UE 311 are determined considering not only the channel environment between the UE 311 and the Node B1 301 but also the channel environment between the UE 311 and the Node B2 303. Thus, if the intact weights are applied, the PDSCH will be provided with a weight difference from a weight for the actual transmit antenna array. Therefore, the method for applying the same weight to the transmit antenna arrays, as used for the DL-DPCH and the PDSCH in the non-SHO region, cannot be used in the SHO region. Accordingly, there has been a demand for an apparatus and method for properly controlling a transmit antenna array for the PDSCH in the SHO region.

SUMMARY OF THE INVENTION

It is, therefore, an object of the present invention to provide an apparatus and method for controlling a transmit antenna array for a PDSCH by a UE in an SHO region.

It is another object of the present invention to provide an apparatus and method for controlling a transmit antenna array for a PDSCH by determining an optimal weight for a PDSCH diversity scheme by a UE in an SHO region.

It is further another object of the present invention to provide an apparatus and method for controlling a transmit antenna array for a PDSCH using an FBI D-field of a UL-DPCCH by a UE receiving the PDSCH in an SHO region.

It is yet another object of the present invention to provide an apparatus and method for controlling a PDSCH transmit antenna array using different transmit antenna diversity schemes for the PDSCH so as not to be associated with a DL-DPCH by a UE receiving the PDSCH in an SHO region.

It is still another object of the present invention to provide an apparatus and method wherein in an SHO region, a Node B transmitting both a PDSCH and a DL-DPCH uses a transmit antenna array, and other Node Bs transmitting only the DL-DPCH use an open loop tranmit antenna diversity scheme such as STTD (Space-Time block coding based Transmit antenna Diversity; open loop transmit diversity).

It is still another object of the present invention to provide an apparatus and method wherein in an SHO region, a Node B transmitting both a PDSCH and a DL-DPCH uses a transmit antenna array, and other Node Bs transmitting only the DL-DPCH use a single antenna without a transmit antenna diversity scheme.

It is sill another object of the present invention to provide a method for switching a transmit antenna diversity mode according to Node Bs when a UE receiving a PDSCH is subject to PDSCH handover in an SHO region.

It is still another object of the present invention to provide a method for transmitting feedback information for a PDSCH and feedback information for a DPCCH over separate UL-DPCCHs when a UE receiving the PDSCH is located in an SHO region.

It is still another object of the present invention to provide a method for properly controlling an E-PDSCH (Enhanced PDSCH) by determining whether data is received over the E-PDSCH from the same Node B on a time-sequence basis in an SHO region.

It is still another object of the present invention to provide a method for previously recognizing a transmission time of a PDSCH, and separately applying a weight to a Node B transmitting the PDSCH so that the Node B transmitting the PDSCH operates in a transmit antenna array mode in an SHO region.

To achieve the above and other objects, there is provided a Node B apparatus having at least two antennas, for controlling a diversity of data transmitted through the antennas. The apparatus comprises a first spreader for spreading first data and outputting a first spread signal; a second spreader for spreading second data and outputting a second spread signal; a first multiplier for multiplying a first weight for a first antenna by the first spread signal output from the first spreader, and outputting a first weighted spread signal; a second multiplier for multiplying a second weight for a second antenna by the first spread signal output from the first spreader, and outputting a second weighted spread signal; a third multiplier for multiplying a third weight for the first antenna by the second spread signal output from the second spreader, and outputting a third weighted spread signal; a fourth multiplier for multiplying a fourth weight for the second antenna by the second spread signal output from the second spreader, and outputting a fourth weighted spread signal; a first adder for adding the first weighted spread signal to the third weighted spread signal, and transmitting the added signal through the first antenna; a second adder for adding the second weighted spread signal to the fourth weighted spread signal, and transmitting the added signal through the second antenna; and a weight generator for determining the first to fourth weights from feedback information received from a UE (User Equipment), and providing the determined first to fourth weights to the first to fourth multipliers, respectively.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obsure the invention in unnecessary detail.

Figure 1A:
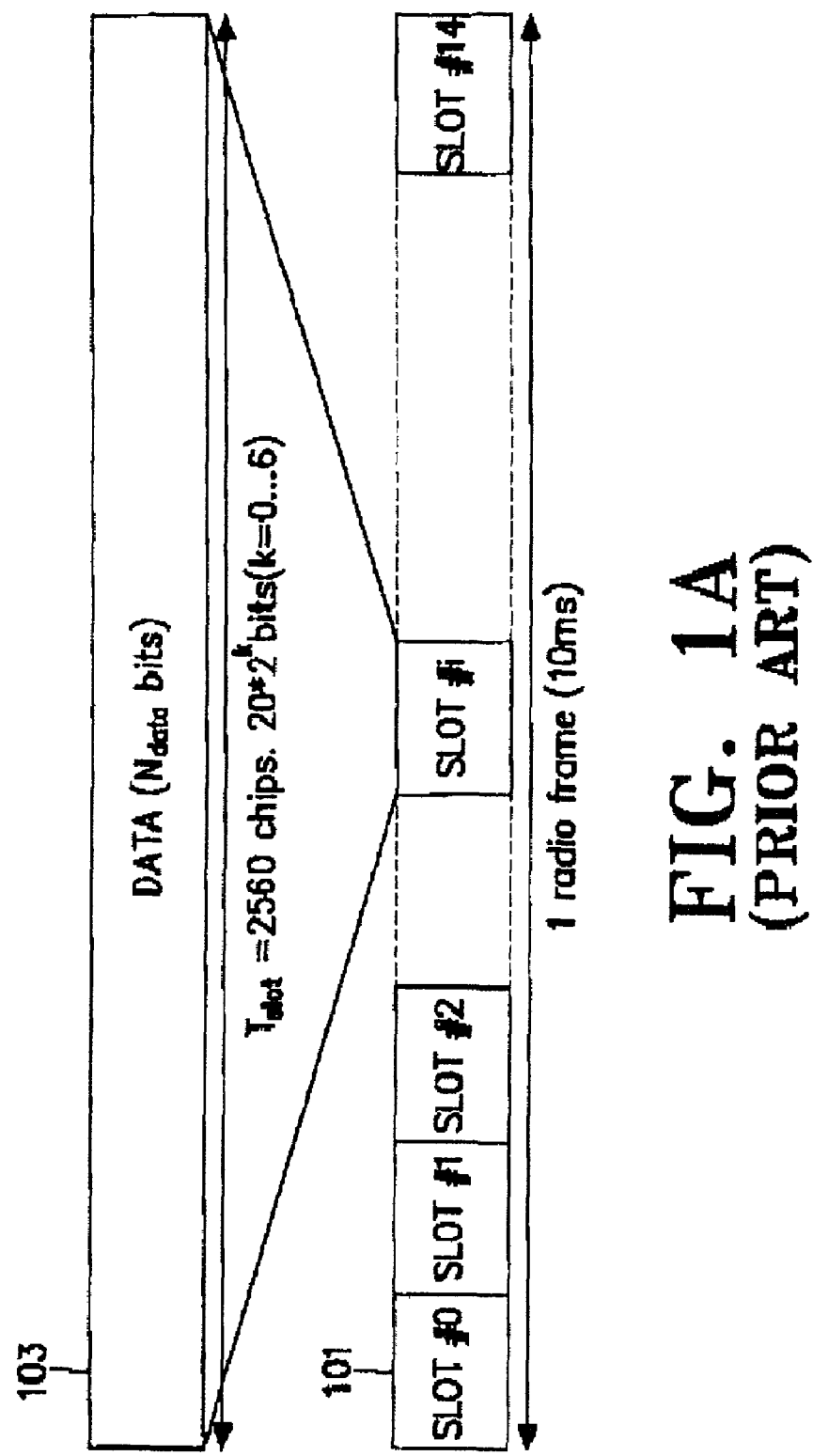
FIG. 1A illustrates a structure of the PDSCH used in a mobile communication system.
Figure 1B:
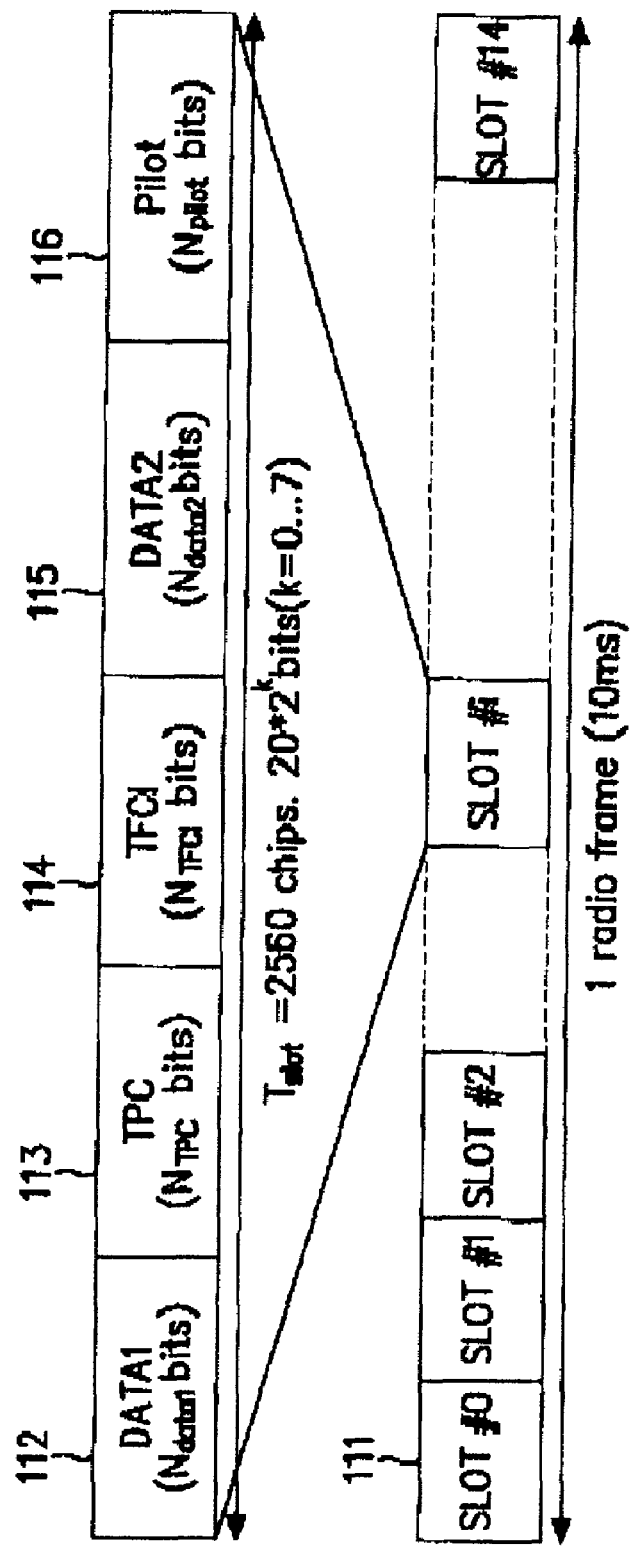
FIG. 1B illustrates a structure of the DL-DPCH assigned to the UE in association with the PDSCH.
Figure 2:
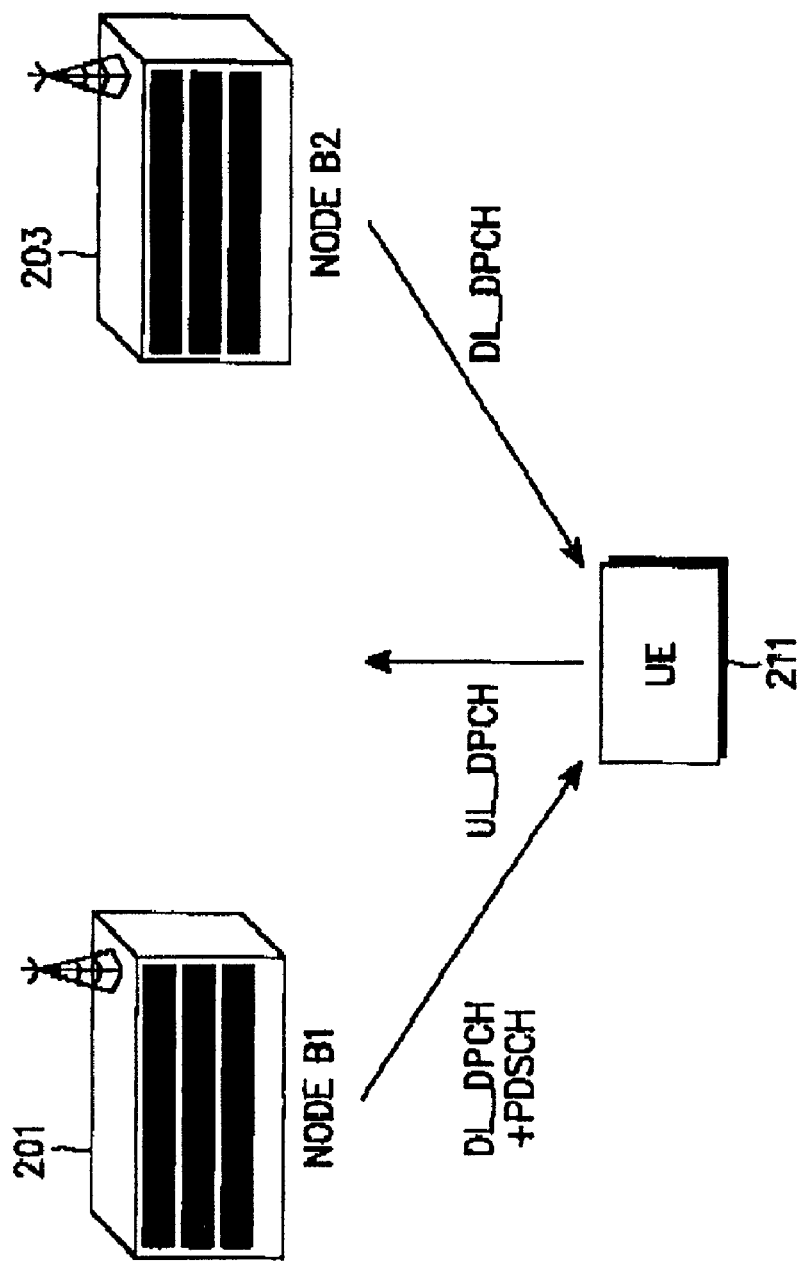
FIG. 2 illustrates downlink and uplink signal flows for the case in which a UE receiving a PDSCH is located in a soft handover region.
Figure 3:
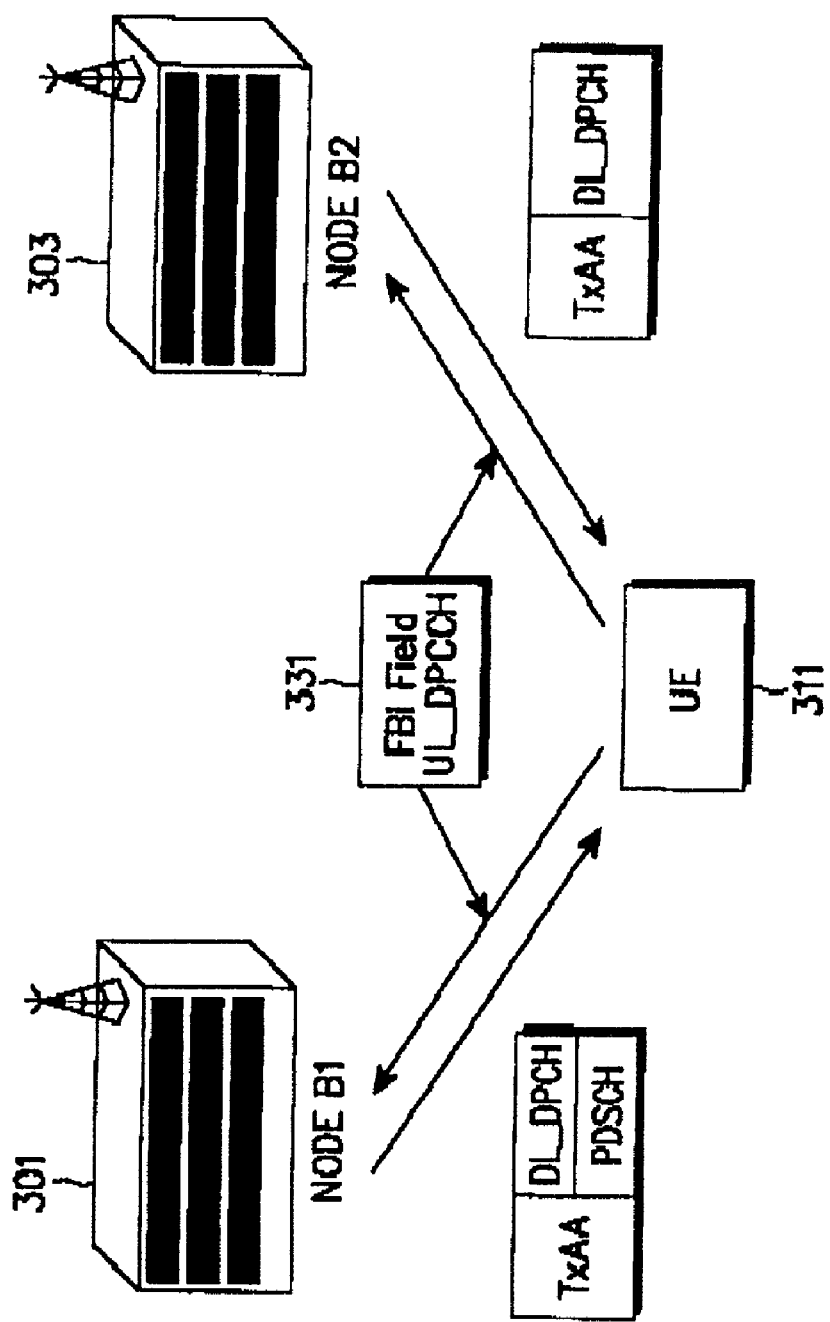
FIG. 3 illustrates an operation of a transmit antenna array using the conventional soft handover scheme.
Figure 4A:
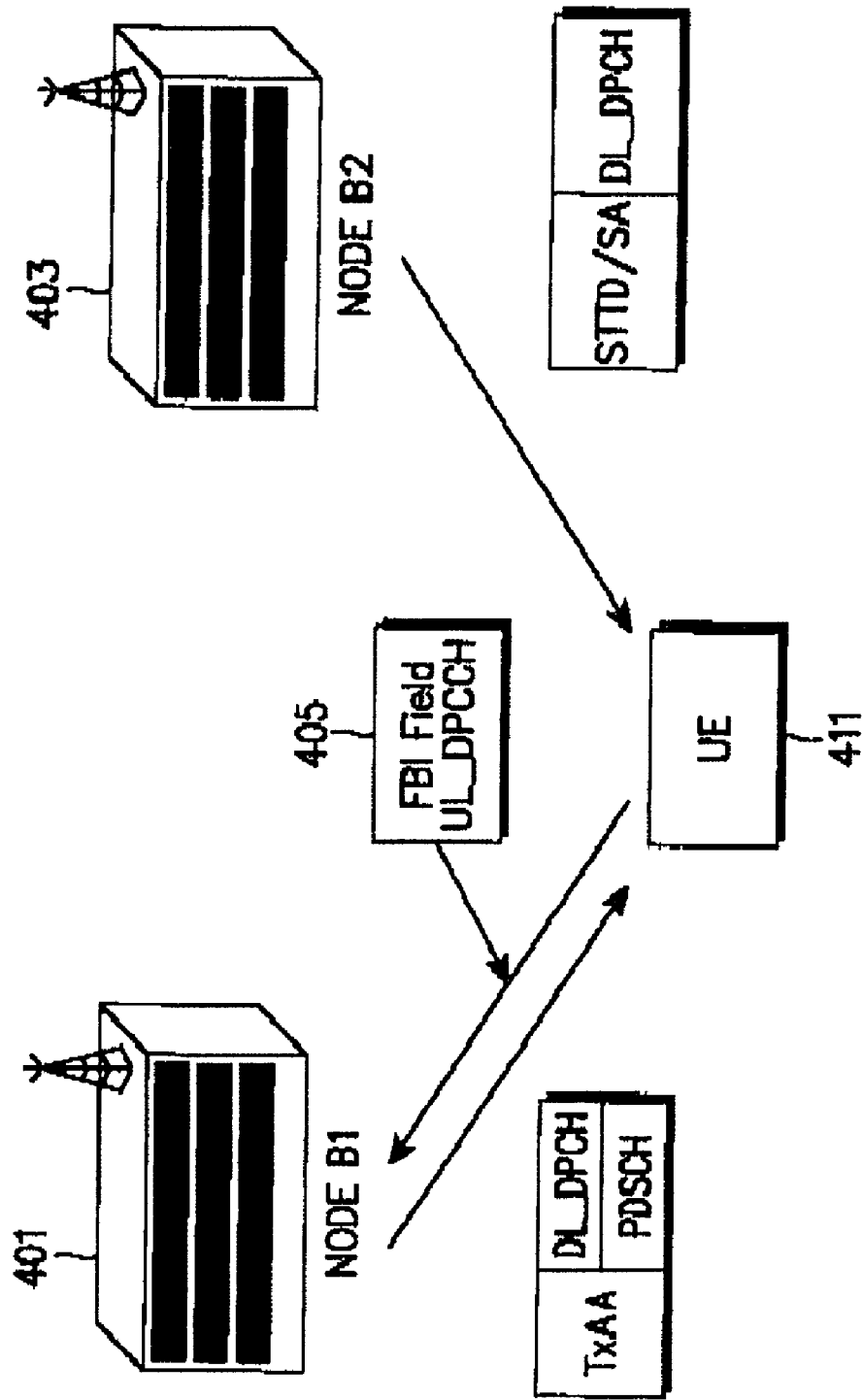
FIG. 4A illustrates a transmit diversity control process according to a first embodiment of the present invention.
Figure 4B:
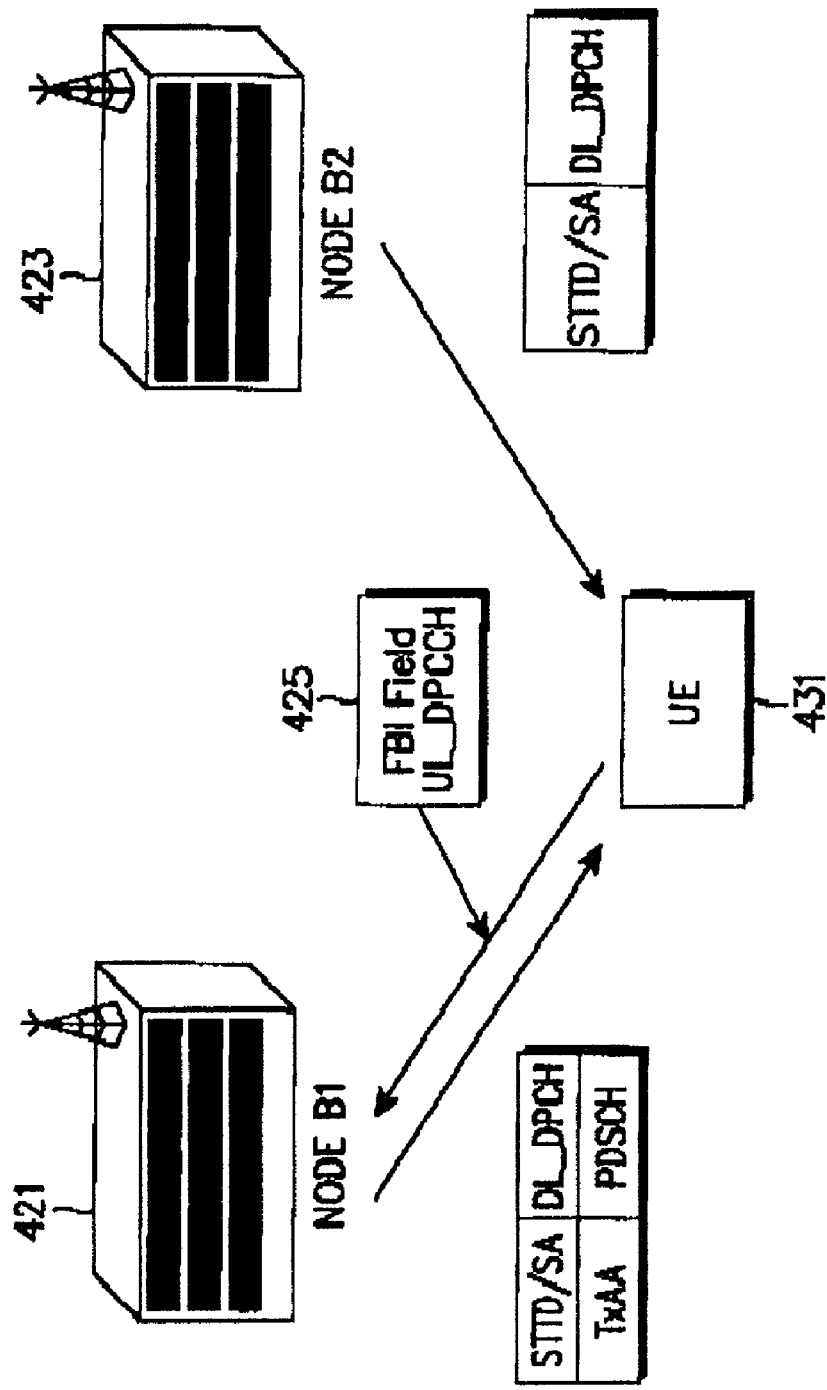
FIG. 4B illustrates a transmit diversity control process according to a second embodiment of the present invention.
Figure 4C:
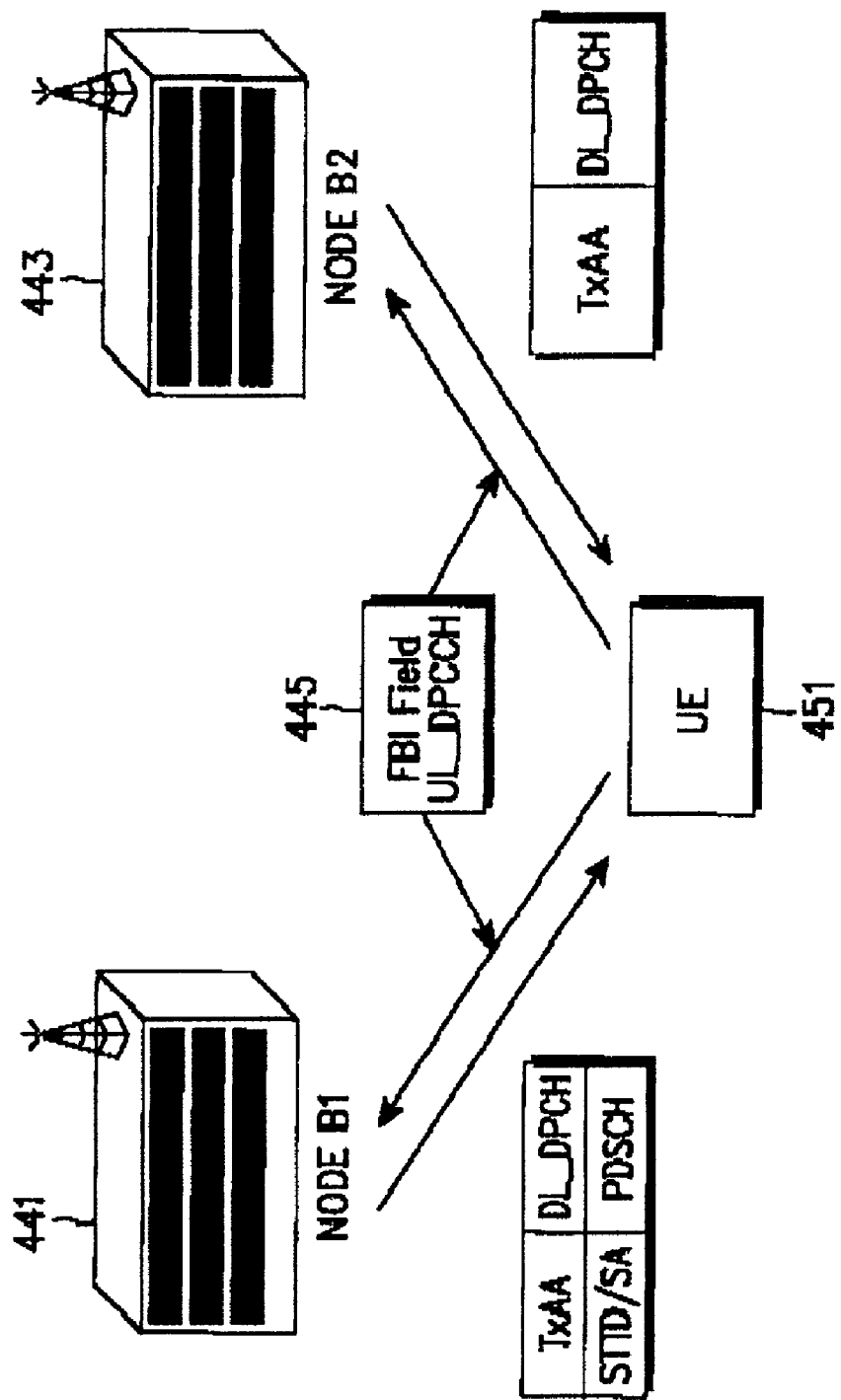
FIG. 4C illustrates a transmit diversity control process according to a third embodiment of the present invention.
Figure 4D:
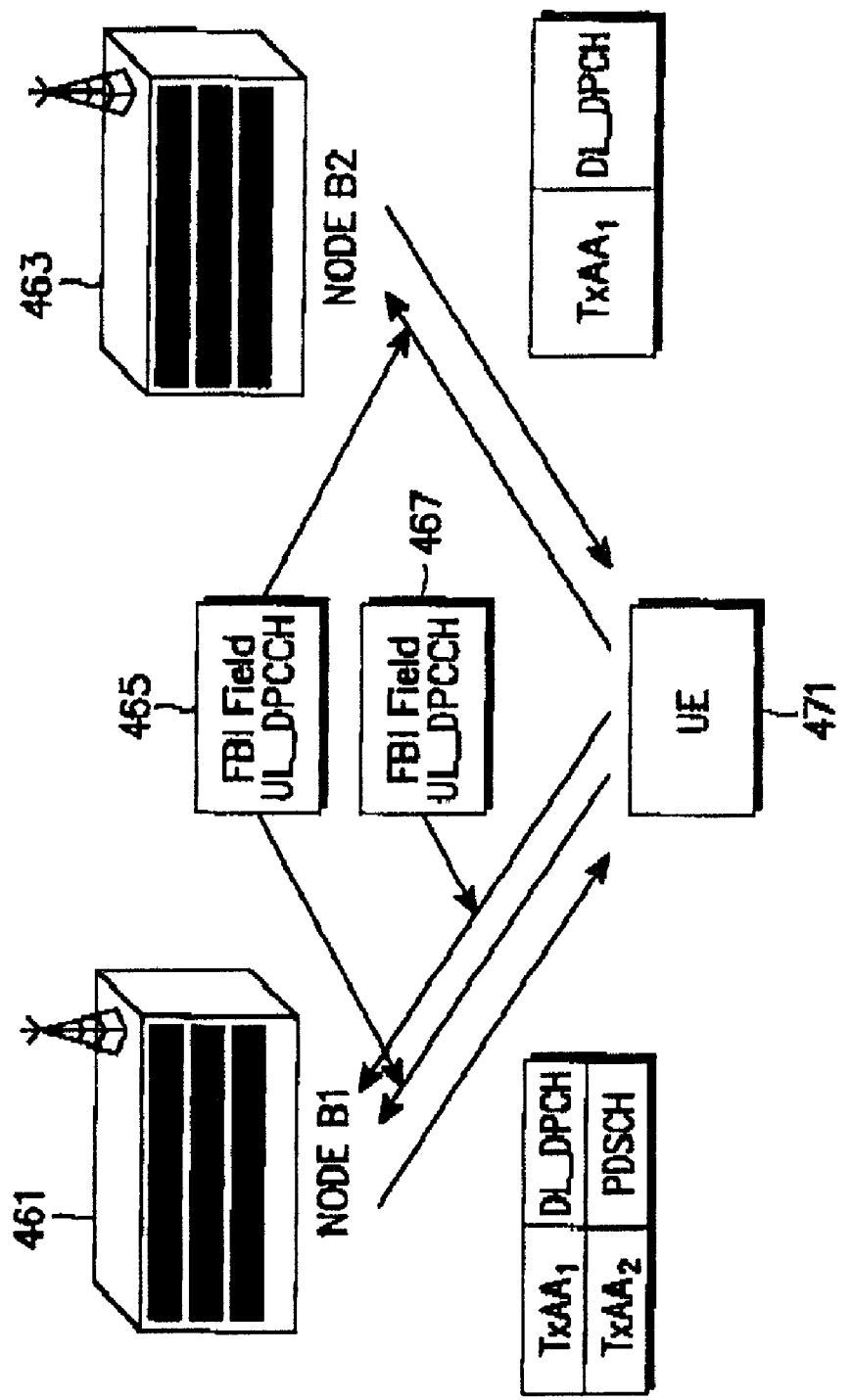
FIG. 4D illustrates a transmit diversity control process according to a fourth embodiment of the present invention.
Figure 4E:
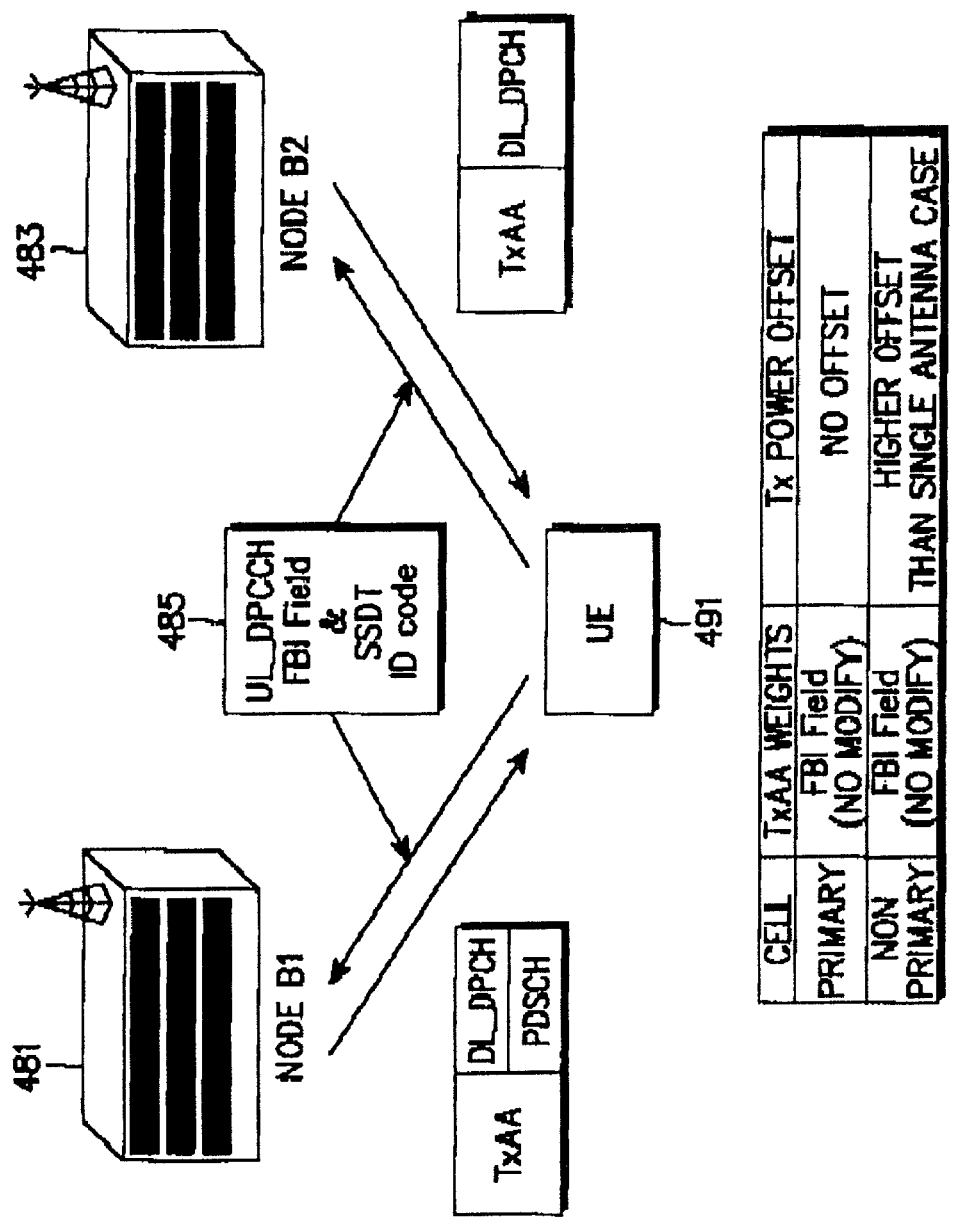
FIG. 4E illustrates a transmit diversity control process according to a fifth embodiment of the present invention.
Figure 4F:
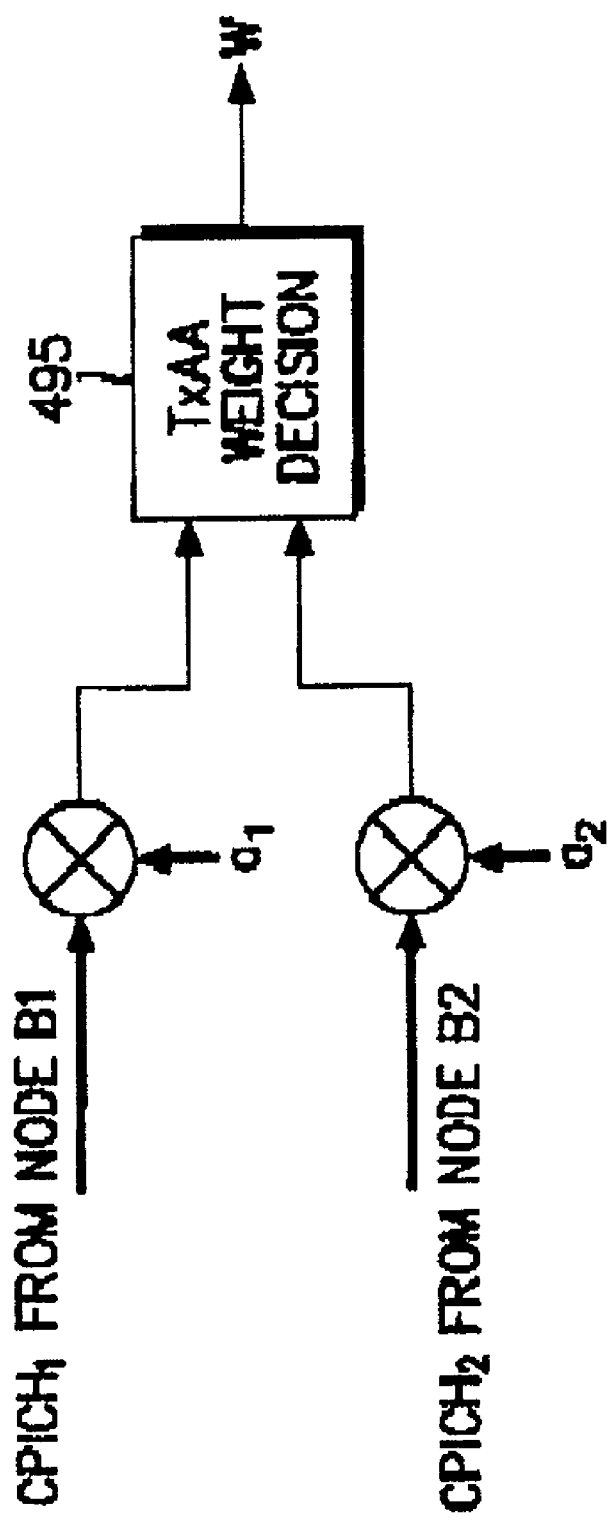
FIG. 4F illustrates an internal structure of a transmit antenna array channel measurer for performing the different embodiments of the process of the present invention.

FIG. 4A illustrates a transmit diversity control process according to a first embodiment of the present invention. FIG. 4B illustrates a transmit diversity control process according to a second embodiment of the present invention. FIG. 4C illustrates a transmit diversity control process according to a third embodiment of the present invention. FIG. 4D illustrates a transmit diversity control process according to a fourth embodiment of the present invention. FIG. 4E illustrates a transmit diversity control process according to a fifth embodiment of the present invention. FIG. 4F illustrates an internal structure of a transmit antenna array channel measurer for performing different embodiments of the present invention.

In describing FIGS. 4A to 4F, the number of Node Bs registered in the active set is shown as 2, for simplicity. The Node B used in the asynchronous W-CDMA system has the same operation as a BTS (Base station Transceiver Subsystem) in the synchronous CDMA-2000 system.

Referring to FIG. 4A, a Node B1 401, a Node B currently communicating with a UE 411, transmits both a DL-DPCH and a PDSCH to the UE 411. A Node B2 403, a Node B newly added to an active set of the UE 411, transmits only the DL-DPCH to the UE 411 when the UE 411 is located in an SHO region. The UE 411 receives both the PDSCH and the DL-DPCH from the Node B1 401, but it receives only the DL-DPCH from the Node B2 403. The UE 411 transmits FBI (Feedback information) included in the UL-DPCCH to the Node B1 401

In FIG. 4A, the UE 411 is located in the SHO region, and enables a new Node B, i.e., the Node B2 403 in the active set to transmit the DL-DPCH signal in a STTD (Space-Time block coded Transmit Diversity) mode or a single-antenna (SA) mode, even though a transmit antenna array (TxAA) mode is available.

The STTD, a type of open loop antenna diversity scheme, is not subject to a feedback operation, so that there is no PDSCH signal loss due to soft combining on the CPICHs from both of the Node Bs. In addition, since the SA uses a single antenna, it does not use diversity. Among the DL-DPCCH information, TxAA weight information on an FBI D-field is actually valid only for the Node B1 401. Therefore, the weight information is calculated depending on the CPICH transmitted from the Node B1 401. This is because in the conventional SHO scheme, the UE 411 enables both the current Node B1 401 and the Node B2 403, newly added to the active set, to perform TxAA transmission, calculates weights from the information determined by combining the information received from the Node B1 401 and the Node B2 403, and applies the calculated weights as PDSCH weights of the Node B1 401. Therefore, the present invention can resolve the problem that in the conventional system, the TxAA operation for the PDSCH does not show proper performance in the SHO region due to a difference between the actual weights and the calculated weights, when the PDSCH, the transmit antenna weight of which is set to the same value of those of the DL-DPCH, is equally used in both the Node B1 401 and the Node B2 403.

Therefore, when the PDSCH being transmitted from the Node B1 401 has been completely handed over to the Node B2 403, the DL-DPCH from the Node B2 403 is transmitted in the TxAA mode along with the PDSCH as shown in FIG. 4A, and the DL-DPCH left in the Node B1 401 is switched from the TxAA mode to the STTD or SA mode. Meanwhile, if the SA mode and the STTD mode can be used together in the same Node B, it is preferable to use the STTD mode rather than the SA mode. This is because the STTD scheme has a diversity effect equal to or better than that of the TxAA scheme, unless the data rate is extremely low. Even though the data rate is low, the STTD scheme, compared with the TxAA scheme, suffers from a decrease in SINR of a maximum of 2 dB, but has a simpler hardware structure.

Meanwhile, in the first embodiment of the present invention, as illustrated in Table 1 in which a switching operation of the UE 411 is shown by table information at a PDSCH receiving point in the SHO region, the DPCHs of the Node Bs other than the PDSCH serving cell transmit signals in the STTD or SA mode, while the PDSCH and DPCH of the PDSCH serving cell continue to operate in the TxAA mode. That is, the UB 411 receives TFCI of the DPCH, the TFCI including the PDSCH transmission start information from the PDSCH serving cell, 5 slots before the PDSCH is transmitted. Upon receiving the TFCI from the PDSCH serving cell, the UE 411 can recognize that the PDSCH will be received prior to its transmission. Therefore, the UB 411 separately creates weights proper only for the PDSCH serving cell, at predetermined time slots before the PDSCH is received, and then feeds back the created weights using the FBI of the UL-DPCCH.

More specifically, the UE in the SHO region receives the DPCH, or the DPCH with the PDSCH according to the transmission condition. Upon receiving the PDSCH along with the DPCH from the Node B, the UE feeds back the FBI of the UL-DPCCH to the respective Node Bs in the active set. Then, the Node B transmitting the DPCH including the PDSCH continues to operate in the TxAA mode using the FBI information, while the other Node Bs simply transmitting only the DPCH do not use the FBI information and enable their DPCHs to operate in the STTD or SA mode. The SA mode includes the TxAA mode where the diversity gain is not obtained by disregarding the FBI or using the previous value. In addition, after transmission of the PDSCH is completed, a mode of the non-DSCH serving cell having been operating in the STTD or SA mode returns to the TxAA mode, and the UE returns to a pre-DSCH transmission state where the UE calculates weights using the phase difference between the CPICHs transmitted from the Node Bs and then feeds back the calculated weights to the Node Bs.

TABLE 1

| Transmission Condition | Determination of FBI | PDSCH | DPCH in the PDSCH cell | DPCH in the non-PDSCH cell |
|---|---|---|---|---|
| PDSCH + DPCH | PDSCH cell | FBI is used. | FBI is used. | STTD/SA |
| Only DPCH | All cells | | FBI is used. | |

Here, the STTD scheme is a type of open loop-mode antenna transit diversity scheme, and if STTD encoding is performed on a data signal A having a format constructed such that symbols $S_1$ and $S_2$ are sequentially input in transmit diversity encoding periods $T^1$ and $T^2$, respectively, then the consecutive symbols $S_1$ $S_2$ are output as $S_1S_2$ through a first antenna and as $-S_2{}^*S_1{}^*$ through a second antenna. The above-stated symbol STTD encoding will be described again in a channel bit unit. As described in the STTD encoding, if it is assumed that the symbols $S_1$ and $S_2$ received in the transmit diversity encoding periods are created with channel bits $b_0b_1$ and $b_2b_3$, respectively, then the received symbols $S_1S_2$ become the channel bits $b_0b_1b_2b_3$. After the channel bits $b_0b_1$ $_{b2}b_3$ are subject to the STTD encoding, the channel bits $b_0b_1b_2b_3$ ($S_1S_2$) are output through through the first antenna and the channel bits $-b_2b_3b_0-b_1$ ($-S_2{}^*S_1{}^*$) are output through the second antenna. Herein, the first antenna is a reference antenna and the second antenna is a diversity antenna.

Referring to FIG. 4B, if a UE 431, to which a downlink channel including the PDSCH is connected, enters the SHO region, the DL-DPCH is transmitted in the STTD or SA mode in both a Node B1 421 and a Node B2 423. The PDSCH being transmitted by only the Node B1 421 is transmitted in the TxAA mode. That is, by using the TxAA only for the PDSCH used for data transmission despite performance degradation of the DL-DPCH, an overall loss of the PDSCH signal is decreased, making it possible to ensure reliable data transmission. Here, a dedicated pilot channel included in the DL-DPCH from the Node B2 421 should additionally include information for PDSCH demodulation. As for the dedicated pilot channel, a method for additionally including the information for the PDSCH demodulation includes TDM (Time Division Multiplexing)/CDM (Code Division Multiplexing)/FDM (Frequency Division Multiplexing)/Space Time Coded-DM/additional or field modifying methods. It is preferable to consider using the TDM, given that the UE receiving the PDSCH has a low data rate.

In the second embodiment of the present invention, as illustrated in Table 2 in which a switching operation of the UE 431 is shown by table information at a PDSCH receiving point in the SHO region, the DL-DPCH is transmitted in the STTD or SA mode in both the Node B1 421 and the Node B2 423, while the PDSCH being transmitted by only the Node B1 421 is transmitted in the TxAA mode using the FBI of the UL-DPCH. Here, the UE 431 receives TFCI including the transmission start information from the PDSCH serving cell, 5 slots before the PDSCH is transmitted, and then recognizes that the PDSCH will be received prior to its transmission. Therefore, the UE 411 creates weights proper only for the PDSCH serving cell, at predetermined time slots before the PDSCH is received, and then feeds back the created weights. In addition, if only the DPCH is received after completion of transmitting the PDSCH, the UE returns to a pre-DSCH transmission state.

TABLE 2

| Transmission Condition | Determination of FBI | DPCH in the PDSCH cell | DPCH in the non-PDSCH cell |
|---|---|---|---|
| PDSCH + DPCH | PDSCH cell | FBI is used. | STTD/SA |
| DPCH | All cells | | FBI is used. |

Referring to FIG. 4C, if a UE 451 receiving the PDSCH from a Node B1 441 enters the SHO region, the Node B1 441 transmitting the PDSCH is set to operate in the STTD or SA mode, even though the PDSCH has operated in the TxAA mode. Of course, in this case, the DL-DPCH operates in the TxAA mode in both the Node B1 441 and the Node B2 443. The PDSCH will show better performance in the TxAA mode than in the STTD or SA mode. However, in the SHO region, since the TxAA scheme applies the weights calculated from the two Node Bs, i.e., the Node B1 441 and the Node B2 443, the weights are different from the weights to be actually applied, thus causing an improper weight application problem, and additionally there occurs a feedback error and delay error, decreasing the performance compared with the SA scheme. Therefore, it is preferable to operate the PDSCH in the STTD or SA mode rather than in the TxAA mode. In this case, however, by using the TxAA for the DPCH, it is possible to obtain better performance for the DPCH having the high throughput and QoS (Quality of Service).

In the third embodiment of the present invention, as illustrated in Table 3 in which a switching operation of the UE 451 is shown by table information at a PDSCH receiving point in the SHO region, the DL-DPCH is transmitted in the TxAA mode in both the Node B1 441 and the Node B2 443, while the PDSCH being transmitted by only the Node B1 441 is transmitted in the STTD or SA mode. Here, the UE 451 calculates weights depending on a phase difference between the CPICHs transmitted from the Node Bs in the same manner. In addition, if only the DPCH is received after completion of transmitting the PDSCH, the UE returns to a pre-DSCH transmission state.

TABLE 3

| Transmission Condition | Determination of FBI | PDSCH | DPCH in the PDSCH cell | DPCH in the non-PDSCH cell |
|---|---|---|---|---|
| PDSCH + DPCH | All cells | STTA/SA | | FBI is used. |
| DPCH | All cells | | | FBI is used. |

Referring to FIG. 4D, if a UE 471 enters the SHO region, the UE 471 creates an additional separate FBI field#2 for the PDSCH in the UL-DPCCH and transmits the created FBI field#2 to the Node B1 461. That is, the UE 471 calculates two different weights and transmits the created weights with FBI field#1 for the DPCH and FBI field#2 for the PDSCH in the UL-DPCH. The method for additionally creating the FBI field includes TDM/CDM/FDM/additional or field modifying methods. It is preferable to use TDM, given that the UE receiving the PDSCH has a low data rate.

The method for separating the FBI field into the FBI field#1 and the FBI field#2 by TDM multiplexing is shown in Table 5. In the conventional method shown in Table 4, one FBI field is used, so that I and Q values of the weight symbols are alternately transmitted on a two-slot unit basis. However, in Table 6 according to an embodiment of the present invention, two symbols are continuously transmitted in a manner of $I_0$, $I_1$, $Q_0$, $Q_1$. Herein, $I_0+Q_0$ is a TxAA weight symbol for the DL-DPCH, and $I_1+Q_1$ is a TxAA weight symbol for the PDSCH. It is assumed in Table 5 that a ratio of weight information of the DL-DPCH to weight information of the PDSCH is 1:1. The ratio can be changed according to the operation mode and the channel environment. In addition, Table 6 shows a slot format used when the weights of the different Node Bs are sent using the FBI field of the PDSCH. In this case, it is necessary to additionally set a field for transmitting the TxAA weights in the UL- DPCCH. The additional field is implemented by using an SSDT field (S field of the FBI) or a pilot field.

TABLE 4

| Slot # | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| D Field | $I_0$ | $Q_0$ | $I_0$ | $Q_0$ | $I_0$ | $Q_0$ | $I_0$ | $Q_0$ | $I_0$ | $Q_0$ | $I_0$ | $Q_0$ | $I_0$ | $Q_0$ | $I_0$ |

TABLE 5

| Slot # | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| D Field | $I_0$ | $I_1$ | $Q_0$ | $Q_1$ | $I_0$ | $I_1$ | $Q_0$ | $Q_1$ | $I_0$ | $I_1$ | $Q_0$ | $Q_1$ | $I_0$ | $I_1$ | $Q_0$ |

TABLE 6

| Slot # | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| $D_1$ Field | $I_0$ | $Q_0$ | $I_0$ | $Q_0$ | $I_0$ | $Q_0$ | $I_0$ | $Q_0$ | $I_0$ | $Q_0$ | $I_0$ | $Q_0$ | $I_0$ | $Q_0$ | $I_0$ |
| $D_2$ Field | $I_1$ | $Q_1$ | $I_1$ | $Q_1$ | $I_1$ | $Q_1$ | $I_1$ | $Q_1$ | $I_1$ | $Q_1$ | $I_1$ | $Q_1$ | $I_1$ | $Q_1$ | $I_1$ |

In the fourth embodiment of the present invention, as illustrated in Table 7 in which a switching operation of the UE 471 is shown by table information at a PDSCH receiving point in the SHO region, $FBI_1$ for the DL-DPCH transmitted by both the Node B1 461 and the Node B2 463 and $FBI_2$ for the PDSCH transmitted by only the Node B1 461 are additionally fed back using the TDM/CDM/FDM/additional or field modifying method. In addition, if only the DPCH is received after completion of transmitting the PDSC—the UE returns to a pre-DSCH transmission state.

TABLE 7

| Transmission Case | Determination of FBI | DPCH in PDSCH | DPCH in the PDSCH cell | DPCH in the non-PDSCH cell |
|---|---|---|---|---|
| PDSCH + DPCH | $FBI_1$: PDSCH cell $FBI_2$: All cells | $FBI_1$ is used | | $FBI_2$ is used. |
| DPCH | FBI: All cells | | | FBI is used. |

Referring to FIG. 4E, if a UE 491 enters the SHO region, i.e., if the PDSCH transmitted by a Node B1 481 enters the SHO region, a method for applying a transmit weight for the PDSCH operates in the same manner as the conventional method, but it identifies a primary Node B using SSDT signaling and then determines whether to increase or maintain PDSCH transmission power before transmission. Of course, the weights for the transmit diversity are used by the PDSCH as well as the DL-DPCH in the two Node Bs in the same manner as the conventional method.

The SSDT signaling should be used not only when the SSDT is used but also when the DL-DPCH including the PDSCH enters the SHO region. Upon receiving primary cell information through the SSDT signaling, the Node B1 481 transmits the PDSCH without additionally increasing the transmission power. Upon receiving non-primary cell information, the Node B1 481 applies a power offset to the PDSCH before transmission. For the transmission power offset, a transmission power offset higher than when the PDSCH uses the TxAA scheme is used. In conclusion, a transmit diversity offset for the SA scheme, a transmission power offset for the STTD scheme and a transmission power offset for the TxAA scheme should be set to have independent values according to the transmit diversity mode of the PDSCH.

An operating principle of the SSDT will be described below. In the SSDT, the UE 491 located in the SHO region assigns temporary IDs (identifications) to the respective Node Bs in its active set, i.e., the Node B1 481 and the Node B2 483, and then, selects a Node B capable of better satisfying the received signal quality of the UE 491 among the Node Bs. Only the selected Node B, e.g., the Node B1 481, transmits the DL-DPDCH to the UE 491, and the Node B2 483 except the selected Node B1 481 transmits only the DL-DPCCH to the UE 491, thereby reducing interference signals generated when all the Node Bs in the active set operate an operation for supporting the SHO. In the SSDT, the Node B transmitting the DL-DPDCH is called a primary Node B, and the primary Node B is periodically updated depending on information measured by the UE 491. To update the primary Node B, the UE 491 transmits the temporary ID of the primary Node B to the other Node Bs in the active sets.

The method for controlling transmission power of PDSCH to which the transmit diversity scheme is applied using the SSDT signaling will be described again in detail with reference to FIG. 4E. Upon receiving CPICHs transmitted from the Node B1 481 and the Node B2 483, the UE 491 compares pilot signal levels of the received CPICHs and determines the primary Node B depending on the compared results. Further, the UE 491 transmits the temporary ID previously set for the determined primary Node B to the other Node Bs, i.e., the Node B2 483. In FIG. 4E, the Node B1 481 is a Node B transmitting the DL-DPCH and the PDSCH to the UE 491, and the Node B2 483 is a Node B newly added to the active set, which transmits only the DL-DPCH to the UE 491.

If the UE 491 transmits the temporary ID for the primary Node B, the Node B1 481 determines the transmission power of the PDSCH by applying the TPC bits of the DL-DPCH, and transmits the signals at the normal transmission power considering that an influence due to the TxAA weights is minimized. That is, whether to increase or decrease the transmission power of the PDSCH is determined depending on the TPC bits transmitted by the UE 491. As a result, when the Node B1 481 becomes the primary Node B, a transmission power control operation including the TxAA operation of the PDSCH is performed in the same manner as when the UE 491 is located in the non-SHO region.

If the Node B1 481 having been serving as the primary Node B is redefined as a secondary Node B and the Node B2 483 having been serving as the secondary Node B is redefined as the primary Node B, the Node B1 481 estimates that the distance from the UE 491 has increased or the channel environment is bad, applies a fixed transmission power offset to the transmission power of the PDSCH and transmits it to the UE 491. Thereafter, in the period where information on the primary Node B is updated, the Node B controls transmission power of the PDSCH depending on the TPC bits transmitted by the UE 491. However, it should be noted that when the TxAA scheme is used for the PDSCH in the SHO region, different values must be used for the fixed transmission power offset according to the diversity modes.

Next, a transmit diversity control method according to a sixth embodiment of the present invention will be described. In the sixth embodiment of the present invention, if the UE receiving the PDSCH exists in the SHO region and the Node B transmitting the PDSCH transmits the PDSCH using the closed-loop transmit antenna diversity, the UE additionally assigns a new UL-DPCCH. Here, the UL-DPCCH transmitted to the Node B when the UE first uses the PDSCH will be referred to as "UL-DPCCH1" and the additional UL-DPCCH newly added when the UE is located in the SHO region will be referred to as "UL-DPCCH2".

Under the $3^{rd}$ generation mobile communication standard, a W-CDMA standard, the UL-DPCCHs used by the UE are spread with the first OVSF (Orthogonal Variable Spreading Factor) code, i.e., an OVSF code having all 1-coded bits, among 256 SF=256 OVSF codes having a length of 256, and is transmitted by the UE through the Q channel by necessity. The reason that the UL-DPCCH is transmitted over the Q channel is to continuously transmit the UL-DPCCH even when the UE has no uplink data to transmit after a call setup, under the W-CDMA standard, and thus prevent discontinuous transmission of the uplink signal, thereby preventing electromagnetic interference. The UL-DPDCH transmitted along with the UL-DPCCH can use a spreading factor of 4 to 256. It is possible to transmit a maximum of 6 UL-DPDCHs. When the 6 UL-DPDCHs are all used, a spreading factor SF=4 is used: 3 UL-DPDCHs are transmitted through the I channel and the remaining 3 UL-DPDCHs are transmitted through the Q channel. Since the data received over the I channel and the data received over Q channels can be independently analyzed at the receiver, there is no interference between the UL-DPDCHs caused by using the same OVSF code in the I channel and the Q channel. In using the new additional UL-DPCCH, the UE can determine the OVSF code to be used for the UL-DPCCH in various ways.

As a first example, when the current UL-DPCCH, i.e., the UL-DPCCH1, is established, an SF=256 OVSF code having all 1-coded bits, a basically used OVSF code, is assigned to the newly assigned UL-DPCCH, i.e., the UL-DPCCH2 and then transmitted through the I channel. As a second example, one of the OVSF codes created in the same OVSF branch as the UL-DPCCH currently used by the UE is selected as the OVSF code to be used for the newly assigned UL-DPCCH2.

As a third example, the SF of the OVSF code to be used for the newly assigned UL-DPCCH2 is changed to 128.

As described above, when the UE receiving the PDSCH communicates with the Node B transmitting the downlink channels using the closed-loop antenna diversity scheme which uses 2 UL-DPCCHs, the communication between the UE and the Node B is performed as follows. The UE transmits feedback information for controlling a closed-loop antenna gain of the DL-DPCHs transmitted by the Node Bs in the active set of the UE, created as the UE enters the SHO region, through the FBI field of the UL-DPCCH previously used before the UE is located in the SHO region, i.e., the UL-DPCCH1, and the UE transmits the feedback information only for the PDSCH to the Node B transmitting the PDSCH, over the FBI field of the newly used UL-DPCCH, i.e., the UL-DPCCH2, thereby properly controlling the respective antenna transmission gains for the PDSCH. As a result, the UE can obtain a sufficient closed-loop antenna diversity gain while receiving the PDSCH. As described above, the UL-DPCCH1 can be used in transmitting the feedback information for controlling an antenna transmit parameter of the DL-DPCH. Alternatively, it is also possible to transmit feedback information for controlling an antenna transmit parameter of the DL-DPCH over the FBI field of the newly used UL-DPCCH2.

When the feedback information for the PDSCH and the feedback information for the DL-DPCH are separately transmitted as stated above, the feedback information for the PDSCH can be created by measuring the CPICH from the Node B transmitting the PDSCH, measuring the pilot field of the DL-DPCH, or directly measuring the PDSCH; and the feedback information for the DPCH can be created based on an optimal antenna gain parameter by summing up the CPICH signals transmitted from the respective Node Bs in the active set of the UE.

Referring next to FIG. 4F, when a Node B1 to which the PDSCH is currently connected is a primary Node B, weights applied to the TxAA scheme are determined depending on a receiving power level of the CPICH received from the Node B1, so that weight factors a1 and a2 are all set to '1'. When the Node B1 is not the primary Node B, the CPICH values are weighted with weight factors a1 and a2 (where a1>a2) in order to increase reliability of the TxAA weights used for the PDSCH, and then provided to a TxAA weight decision device 495. The TxAA weight decision device 495 differently creates the weights to be provided to all the cell in the active set according to the circumstances. A TxAA channel measurement operation by the UE receiving the PDSCH using the proposed TxAA scheme can be represented by, $$P = (a_1 \|H_1 w\|)^2 + (a_2 \|H_2 w\|)^2 \qquad (1)$$

In Equation (1), $H_i$ (where i denotes an ID number of the Node B) indicates a channel matrix, w indicates an antenna weight, and $a_i$ indicates a weight factor for the Node $B_i$.

Figure 5:
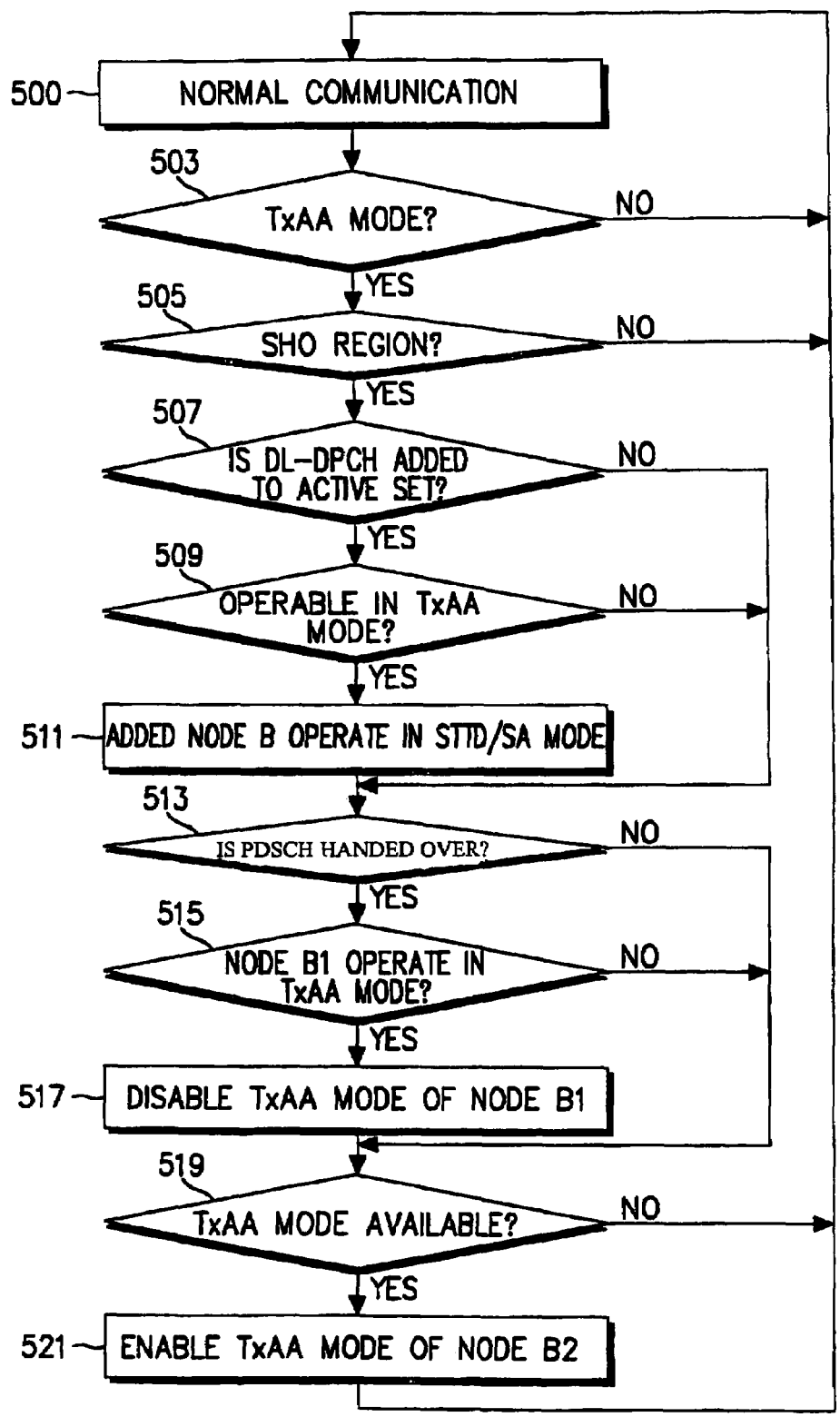
FIG. 5 illustrates a flow chart of a procedure for the transmit diversity control process shown in FIG. 4A.

FIG. 5 illustrates a flowchart for the transmit diversity control process shown in FIG. 4A. Referring to FIG. 5, in a state where the UE 411 communicates with the Node B1 401, i.e., where the UE 411 performs normal communication in a non-SHO region (Step 500), the UE 411 determines whether the DL-DPCH with the PDSCH and the PDSCH received from the Node B1 401 operate in the TxAA mode (Step 503). If it is determined that the PDSCH and the DL-DPCH do not operate in the TxAA mode, the UE 411 returns to Step 500. However, if the PDSCH and the DL-DPCH operate in the TxAA mode, the UE 411 determines whether it is located in the SHO region (Step 505). If it is determined that the UE 411 is located in a non-SHO region, the UE 411 returns to Step 500. If, however, it is determined that the UE 411 is located in the SHO region, the UE 411 determines whether the DL-DPCH of the Node B2 403, i.e., the other Node B except the current Node B1 401 is added to the active set (Step 507).

If it is determined that the DL-DPCH of the Node B2 403 is not added to the active set, the UE 411 proceeds to Step 513. Otherwise, if it is determined that the DL-DPCH of the Node B2 403 is added to the active set, the UE 411 determines whether the Node B whose DL-DPCH is added to the active set can operate in the TxAA mode (Step 509). If it is determined that the Node B whose DL-DPCH is added to the active set cannot operate in the TxAA mode, the UE 411 proceeds to Step 513. If, however, it is determined that the Node B whose DL-DPCH is added to the active set can operate in the TxAA mode, the UE 411 allows the Node B whose DL-DPCH is added to the active set to use the STTD or SA mode instead of the TxAA mode (Step 511). Next, the UE 411 determines whether the PDSCH is handed over (Step 513). If it is determined that the PDSCH is not handed over, the UE 411 proceeds to Step 519. Otherwise, if it is determined that the PDSCH is handed over, the UE 411 determines whether the Node B1 401 uses the TxAA mode (Step 515).

If it is determined that the Node B1 401 does not use the TxAA mode, the UE proceeds to Step 519. However, if it is determined that the Node B1 401 uses the TxAA mode, the UE 411 switches the TxAA mode of the Node B1 401 to the STTD or SA mode (Step 517). Thereafter, the UE 411 determines whether the Node B2 403 can use the TxAA mode (Step 519). If it is determined that the Node B2 403 cannot use the TxAA mode, the UE 411 returns to Step 500. However, if it is determined that the Node B2 403 can use the TxAA mode, the UE 411 enables the TxAA mode of the Node B2 403 and then ends the operation (Step 521).

Figure 6:
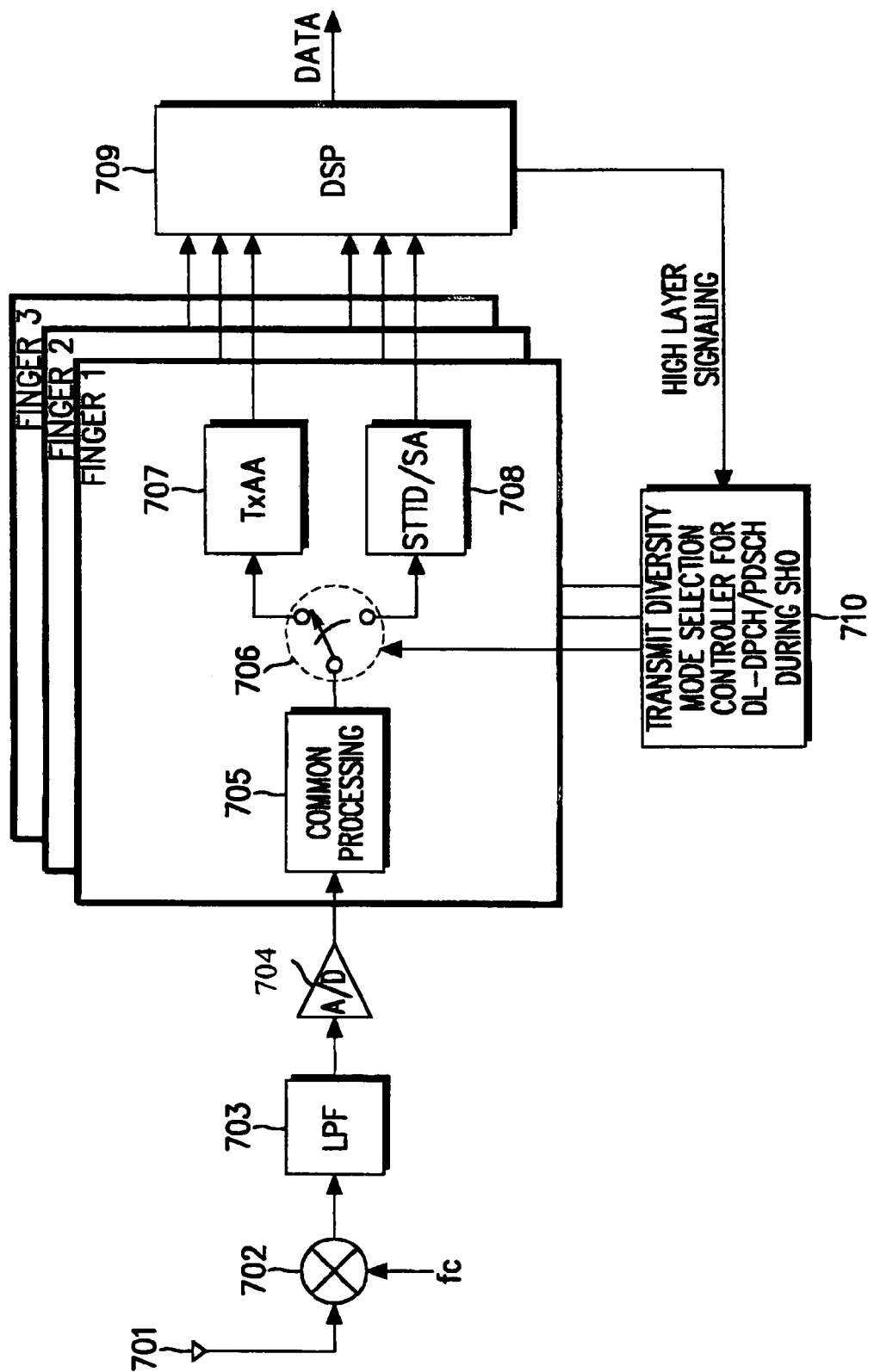
FIG. 6 illustrates a structure of a UE for performing the transmit diversity control process shown in FIG. 4A.

FIG. 6 illustrates a structure of a UE for performing the transmit diversity control process shown in FIG. 4A. Referring to FIG. 6, an input signal of the UE 411 is received through an antenna 701 and then provided to a down-converter 702. The down-converter 702 down-converts the received signal by mixing it with a composite frequency $f_c$ and provides the down-converted signal to a lowpass filter (LPF) 703. The lowpass filter 703 lowpass-filters the down-converted signal output from the down-converter 702 and provides the filtered baseband signal to an analog-to-digital (A/D) converter 704. The A/D converter 704 converts the analog baseband signal output from the lowpass filter 703 to a digital signal and provides the converted digital signal to a finger#1.

In the finger#1, a common processor 705 commonly processes the digital signal output from the A/D converter 704 in the TxAA mode and the STTD mode and provides its output to a switch 706. The switch 706, under the control of a transmit diversity mode selection controller (or transmit diversity mode selection controller for DL-DPCH/PDSCH during SHO) 710, switches the output of the common processor 705 to a TxAA mode processor 707 or an STTD/SA mode processor 708, and then the switched signals output from the TxAA mode processor 707 and the STTD/SA mode processor 708 are provided to a digital signal processor (DSP) 709. Here, the transmit diversity mode selection controller 710 operates in accordance with an algorithm shown in FIG. 5. In FIG. 6, a finger#2 and a finger#3 have the same operation as that of the finger#1. The DSP 709 processes the digital data for a service required by the UE 411 using the results output from the TxAA mode processor 707 or the STTD/SA mode processor 708, and transmits the processed data to an upper layer.

Figure 7:
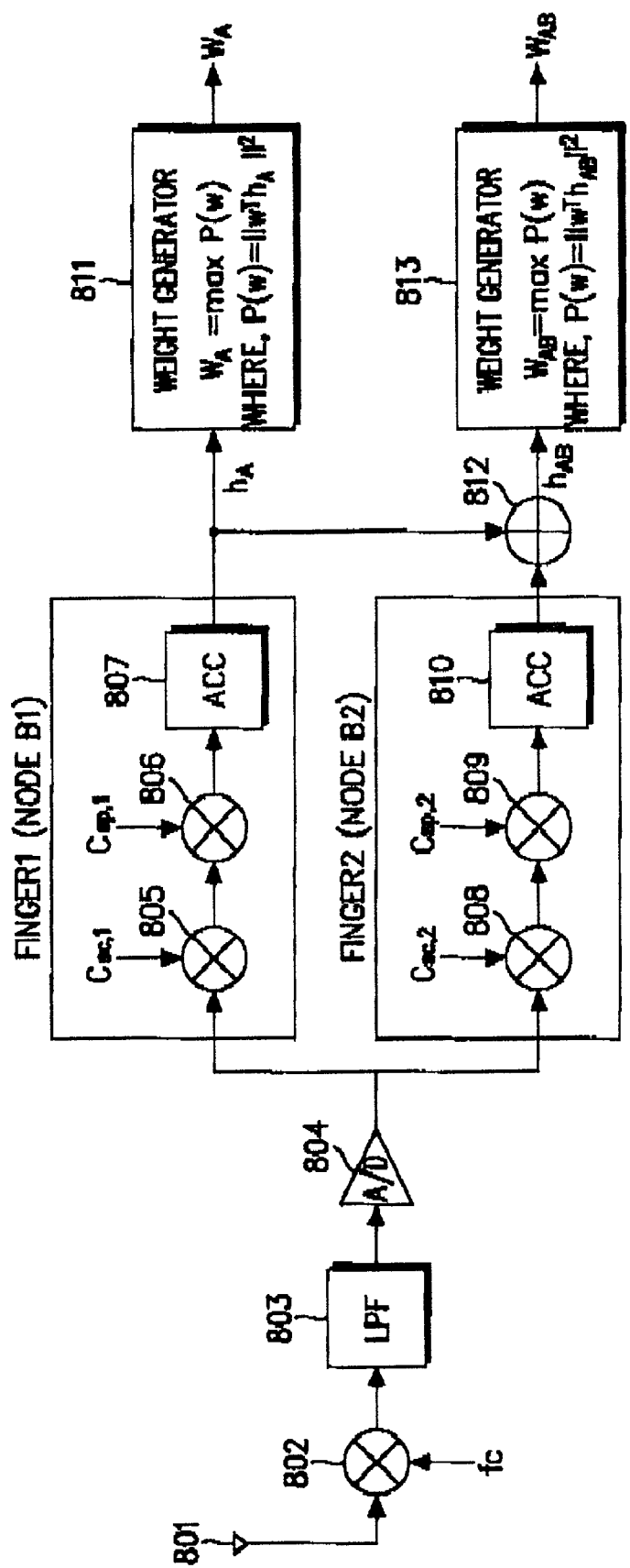
FIG. 7 illustrates a structure of a UE for performing the transmit diversity control process shown in FIG. 4D.

FIG. 7 illustrates a structure of a UE for performing the transmit diversity control process shown in FIG. 4D. Referring to FIG. 7, a radio signal in the air is received through an antenna 801 and then provided to a down-converter 802. The down-converter 802 down-converts the received radio signal by multiplying with a predetermined composite frequency $f_c$ and provides its output signal to an LPF 803. The LPF 803 lowpass-filters the signal output from the down-converter 802 and provides the lowpass-filtered analog signal to an A/D converter 804. The A/D converter 804 converts the analog signal output from the LPF 803 to a digital signal and provides the converted digital signal a first finger Finger#1 and a second finger Finger#2. Here, the first finger is for processing the signals received from the Node B1 461, while the second is for processing the signals received from the Node B2 463 of FIG. 4D.

In the finger1, a descrambler 805 descrambles the output signal of the A/D converter 804 by multiplying with a scrambling code $C_{SC,1}$ for the Node B1 461. A despreader 806 despreads the output signal of the descrambler 805 by multiplying it by a spreading code $C_{SP,1}$ for the Node B1 461. An accumulator 807 accumulates the output signal of the despreader 806 and provides the accumulated signal to a weight generator 811. The weight generator 811 calculates a weight $w_A = \mathrm{argmax} \|w^T h_A\|^2$ for maximizing SINR depending on the signal output from the accumulator 807.

In the finger2, a descrambler 808 descrambles the output signal of the A/D converter 804 by multiplying with a scrambling code $C_{SC,2}$ for the Node B2 463. A second despreader 809 despreads the output signal of the descrambler 808 by multiplying it by a spreading code $C_{SP,2}$ for the Node B2 463. An accumulator 810 accumulates the output signal of the second despreader 809 and provides the accumulated signal to an adder 812. The adder 812 adds the output signal of the accumulator 807 to the output signal of the accumulator 810, and provides its output to a weight generator 813. The weight generator 813 calculates a weight $w_{AB} = \mathrm{argmax} \|w^T h_{AB}\|^2$ for maximizing SINR depending on the signal output from the adder 812.

Figure 8:
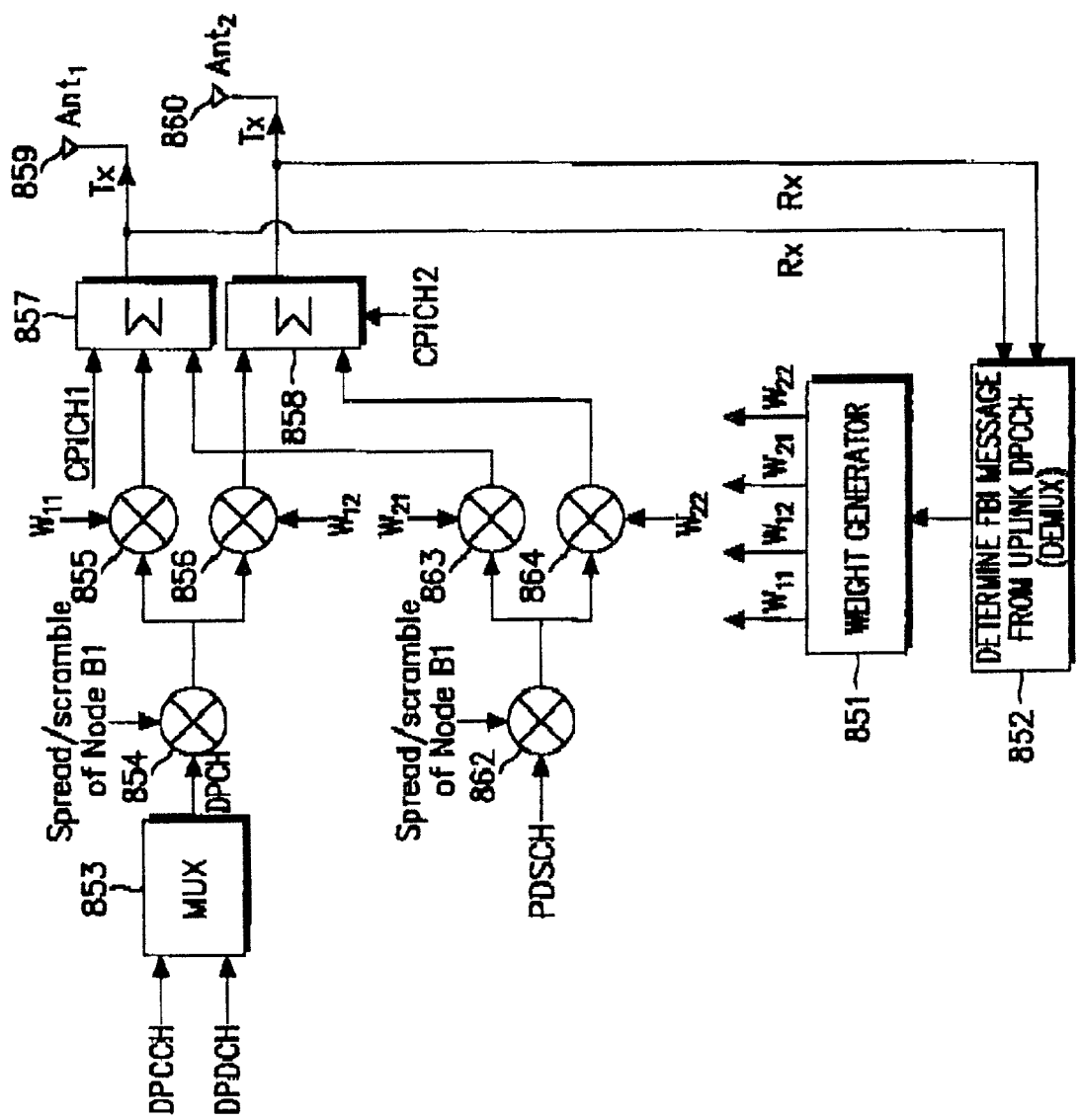
FIG. 8 illustrates a structure of a Node B for performing the transmit diversity control process shown in FIG. 4D.

FIG. 8 illustrates a structure of a Node B for performing the transmit diversity control process shown in FIG. 4D. Referring to FIG. 8, radio signals in the air received from the UE 471 through a first antenna (ANT1) 859 and a second antenna (ANT2) 860 are provided to a demultiplexer (DEMUX) 852. The DEMUX 852 detects feedback information (FBI) from DPCCH signals of the radio signals received through the first and second antennas 859 and 860, and provides the detected feedback information to a weight generator 851. The weight generator 851 generates weights w=|w|exp(j) of complex floating points, i.e., $w_{11}$, $W_{12}$, $W_{21}$ and $w_{22}$, by properly combining the input bits based on the feedback information from the DEMUX 852, and provides the generated weights $w_{11}$, $w_{12}$, $W_{21}$ and $w_{22}$ to multipliers 855, 856, 863 and 864, respectively.

Meanwhile, a multiplexer (MUX) 853 multiplexes a DPDCH signal and a DPCCH signal into a DPCH (Dedicated Physical Channel) signal, and provides the DPCH signal to a multiplier 854. The multiplier 854 multiplies the DPCH signal output from the MUX 853 by a spreading and scrambling code for the Node B1 461, and provides its output signal to the multiplier 855 and the multiplier 856. The multiplier 855 multiplies the weight $w_{11}$ output from the weight generator 851 by the output signal of the multiplier 854, and provides its output to a summer 857. The multiplier 856 multiplies the weight $W_{12}$ output from the weight generator 851 by the output signal of the multiplier 854, and provides its output to a summer 858.

Further, a multiplier 862 multiplies a PDSCH signal by a spreading and scrambling code for the Node B1 461 and provides its output to the multiplier 863 and the multiplier 864. The multiplier 863 multiplies the weight $w_{21}$ output from the weight generator 851 by the output signal of the multiplier 862, and provides its output to the summer 857. The multiplier 864 multiplies the weight $w_{22}$ output from the weight generator 851 by the output signal of the multiplier 862, and provides its output to the summer 858.

The summer 857 sums up the output signal of the multiplier 855, the output signal of the multiplier 863 and a first common pilot channel signal ($CPICH_1$), and transmits the summed signal through the first antenna 859. The summer 858 sums up the output signal of the multiplier 856, the output signal of the multiplier 864 and a second common pilot channel signal ($CPICH_2$), and transmits the summed signal through the second antenna 860. Accordingly, it is possible to apply different weights to the DL-DPCH signal and the PDSCH signal based on the feedback information of the UP-DPCCH signal received from the UE 471.

Meanwhile, in FIGS. 4A to 4F, if the mode switching is performed using FCS (Fast Cell Selection) information, the enhanced PDSCH (E-PDSCH) supporting the FCS will operate as follows. Here, the FCS determines from which Node B the UE is to receive data, and provides the Node B with the corresponding information. Therefore, if the UE determines the Node B which will transmit the E-PDSCH, based on the FCS, then the UE creates weights proper for the E-PDSCH serving cell, and then transmits the created weights to the E-PDSCH serving cell using the FBI. That is, in the SHO region, the UE previously recognizes an arrival time of the E-PDSCH by receiving the TFCI bits including information on the transmission start point from the E-PDSCH serving cell, and thus switches to the above-stated modes, i.e., the modes of FIGS. 4A to 4F. In other words, the target Node B calculating the weights is dynamically changed according to the Node B determined by the UE.

For example, when E-PDSCH data of two or more frames is consecutively received from the same Node B by consulting the FCS information, the UE can transmit FSM (Finite States Machine, a type of shift register) bit information of the TxAA FBI, beginning at a next bit of the previous bit position, not at the initial bit. If the UE changed the cell or failed to receive the just previous frame, the UE retransmits the FSM bits from the initial bit. However, when the UE simply transmits the FMS bit information in the same format like in Mode#1 of 3GPP (or UMTS W-CDMA), it is possible to continuously transmit the FSM bits of the FBI regardless of whether the cell is determined based on the FCS. In addition, when both the E-PDSCH and the normal PDSCH use the information transmitted by the E-PDSCH and the PDSCH in the SHO region, the E-PDSCH and the PDSCH must operate in accordance with the number of slots for transmitting the FBI, required by the TxAA.

Figure 9:
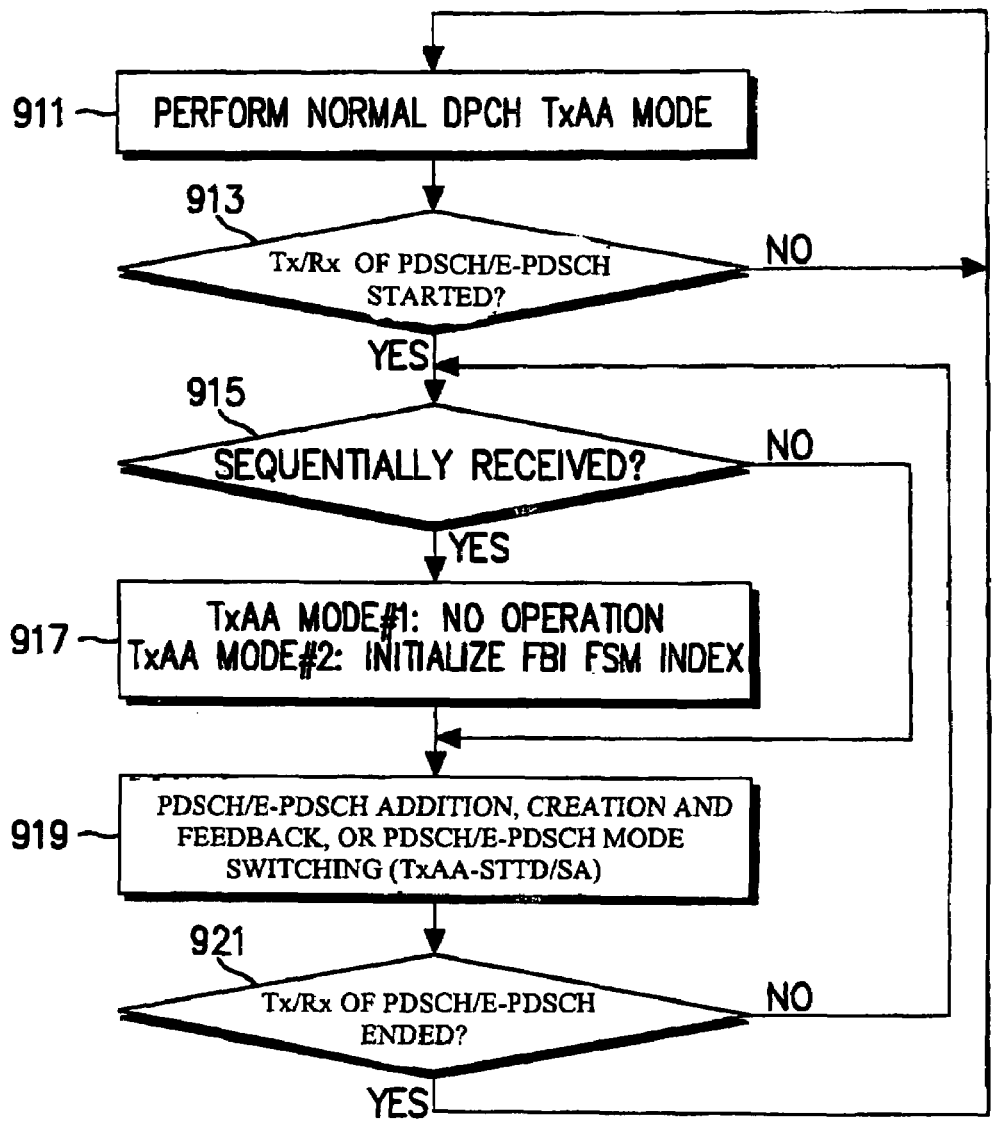
FIG. 9 illustrates a flow chart of a procedure for transmitting PDSCH/E-DSCH on the basis of a transmission time point according to a seventh embodiment of the present invention.

FIG. 9 illustrates a procedure for transmitting PDSCH/E-PDSCH on the basis of a transmission time point according to a seventh embodiment of the present invention. Referring to FIG. 9, in the SHO region between the Node Bs supporting the TxAA mode, the UE performs a general DPCH TxAA mode (Step 911). When the UE enters the SHO region, the UE determines whether the PDSCH/E-DSCH is received from the Node B in the DPCH TxAA mode (Step 913). If it is determined that the PDSCH/E-DSCH is not received from the Node B, the UE performs the general DPCH TxAA mode (Step 911). However, if it is determined that the PDSCH/E-DSCH is received from the Node B, the UE repeatedly selects a Node B having a good channel condition depending on the FCS, thereby increasing the reliability and minimizing the determination time. That is, in the SHO region, the UE repeatedly selects a Node B having the best channel condition among a plurality of Node Bs from which signals are received, using the FCS, thereby selecting the Node B having the best channel condition. Upon receiving the PDSCH/E-DSCH, the UE determines whether data is received from the same Node B on a time-sequence basis (Step 915). If it is determined that the data is received from the same Node B on a time-sequence basis, the UE maintains a TxAA FBI FSM index in Mode#1 using 2 bits, and initializes the TxAA FBI FSM index to '0' in Mode#2 using 4 bits (Step 917). If the data is received from the same Node B on a time-sequence basis, the UE applies the new data output on the basis of the previous result. However, if the data is not received from the same Node B or received with time delay, the UE applies a new value on the basis of a predetermined offset or the result which was previously applied to another Node B, and then performs PDSCH/E-DSCH addition, creation and feedback, or PDSCH/E-DSCH mode switching between the TxAA mode and the STTD/SA mode (Step 919). Thereafter, the UE determines whether transmission/reception of the PDSCH/E-DSCH is completed (Step 921). If it is determined that transmission/reception of the PDSCH/E-DSCH is completed, the UE changes its operation mode from the STTD or SA mode to the DPCH TxAA mode (Step 911). Otherwise, if it is determined that transmission/reception of the PDSCH/E-DSCH is not completed, the UE determines again whether the PDSCH/E-DSCH is received from the Node B (Step 913).

As described above, in the SHO region, the UE can control a transmit antenna array for the PDSCH, making it possible to apply proper transmit antenna diversity weights. In addition, in the SHO region, the UE can control the transmit antenna array for the E-PDSCH/PDSCH, making it possible to apply the proper transmit antenna weights. Further, in the SHO region, the UE can separately apply a transmit antenna weight for the PDSCH and a transmit antenna weight for the DL-DPCH, thereby resolving the problem caused by the conventional SHO scheme that the applied weights are different from the proper transmit antennas weights due to the use of the same transmit antenna weights for the DPSCH and the DL-DPCH.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Node B apparatus having at least two antennas, for controlling a diversity of data transmitted through the antennas, comprising:

a first spreader for spreading first data and outputting a first spread signal;

a second spreader for spreading second data and outputting a second spread signal;

a first multiplier for multiplying a first weight for a first antenna by the first spread signal output from the first spreader, and outputting a first weighted spread signal;

a second multiplier for multiplying a second weight for a second antenna by the first spread signal output from the first spreader, and outputting a second weighted spread signal;

a third multiplier for multiplying a third weight for the first antenna by the second spread signal output from the second spreader, and outputting a third weighted spread signal;

a fourth multiplier for multiplying a fourth weight for the second antenna by the second spread signal output from the second spreader, and outputting a fourth weighted spread signal;

a first adder for adding the first weighted spread signal to the third weighted spread signal, and transmitting the added signal through the first antenna;

a second adder for adding the second weighted spread signal to the fourth weighted spread signal, and transmitting the added signal through the second antenna; and a weight generator for determining the first to fourth weights from feedback information received from a UE (User Equipment), and providing the determined first to fourth weights to the first to fourth multipliers, respectively.

2. The Node B apparatus as claimed in claim 1, wherein the feedback information is FBI (feedback information) of an uplink dedicated physical control channel (UL-DPCCH) received from the UE.

3. The Node B apparatus as claimed in claim 1, wherein the first data is dedicated physical channel (DPCH) data and the second data is physical downlink shared channel (PDSCH) data.

4. An apparatus for controlling a diversity of data transmitted from a Node B in a UE which is on a soft handover process between a first Node B which transmits a downlink shared channel signal and a dedicated channel signal and a second Node B, which transmits the dedicated channel signal, comprising:

a first despreader for despreading a signal received from the first Node B with a first spreading code and outputting a first despread signal;

a second despreader for despreading the signal received from the second Node B with a second spreading code and outputting a second despread signal;

a transmit antenna array (TxAA) weight generator for generating a TxAA weight for applying to the downlink shared channel and the dedicated channel by receiving the first despread signal and the second despread signal, wherein the TxAA weight is determined more by the first Node B than by the second Node B; and a transmitter for generating feedback information including the TxAA weight and transmitting the generated feedback information to the first Node B and the second Node B.

5. The apparatus as claimed in claim 4, wherein the first despread signal is a DPCH signal and the second despread signal is a PDSCH signal.

6. A method for controlling Node B having at least two antennas and controlling a diversity of data transmitted through the antennas, comprising the steps of:

determining first to fourth weights from feedback information received from a UE;

generating a first spread signal by spreading first data;

generating a second spread signal by spreading second data;

generating a first weighted spread signal by multiplying a first weight for a first antenna by the first spread signal;

generating a second weighted spread signal by multiplying a second weight for a second antenna by the first spread signal;

generating a third weighted spread signal by multiplying a third weight for the first antenna by the second spread signal;

generating a fourth weighted spread signal by multiplying a fourth weight for the second antenna by the second spread signal;

adding the first weighted spread signal to the third weighted spread signal, and transmitting the added signal through the first antenna; and adding the second weighted spread signal to the fourth weighted spread signal, and transmitting the added signal through the second antenna.

7. The method as claimed in claim 6, wherein the feedback information is feedback information of an uplink dedicated physical control channel (UL-DPCCH) received from the UE.

8. The method as claimed in claim 6, wherein the first data is dedicated physical channel (DPCH) data and the second data is physical downlink shared channel (PDSCH) data.

9. A UE for controlling a diversity of data transmitted from a Node B in a UE which is on a soft handover process between a first Node B which transmits a downlink shared channel sianal and a dedicated channel signal and a second Node B which transmits the dedicated channel signal, comprising the steps of:

despreading a signal received from the first Node B with a first spreading code and outputting a first despread signal;

despreading the signal received from the second Node B with a second spreading code and outputting a second despread signal;

generating a TxAA weight for applying to the downlink shared channel and the dedicated channel by receiving the first despread signal and the second despread signal, wherein the TxAA weight is determined more by the first Node B than by the second Node B; and generating feedback information including the TxAA weight and transmitting the generated feedback information to the first Node B and the second Node B.

10. The UE control method as claimed in claim 9, wherein the first despread signal is a DPCH signal and the second despread signal is a PDSCH signal.

* * * * *